US005712985A

United States Patent [19]

Lee et al.

[11] Patent Number: 5,712,985

[45] **Date of Patent: *Jan. 27, 1998**

[54] SYSTEM AND METHOD FOR ESTIMATING BUSINESS DEMAND BASED ON BUSINESS INFLUENCES

[76] Inventors: Michael D. Lee, 3213 Chandra La., Albuquerque, N. Mex. 87124; Randall K. Fields, 333 Main St., P.O. Box 5000, Park City, Utah 84060; Jamie T. Pond, 2016 E. Windham Cir., Salt Lake City, Utah 84109; Barrire K. Tondevold, 5117 Germania Pl., Murray, Utah 84123

[*] Notice: The term of this patent shall not extend beyond the expiration date of Pat. No. 5,459,656.

[21] Appl. No.: 542,847

[22] Filed: Oct. 13, 1995

Related U.S. Application Data

[63] Continuation-in-part of Ser. No. 23,111, Feb. 26, 1993, Pat. No. 4,459,656, which is a continuation-in-part of Ser. No. 808,982, Dec. 17, 1991, which is a continuation of Ser. No. 406,069, Sep. 12, 1989.

[51] Int. Cl.[6] .......... G06F 17/60

[52] U.S. Cl. .......... 395/207; 395/210; 395/208; 364/468.01; 364/468.02; 364/468.03

[58] Field of Search .......... 395/208, 210, 395/207; 364/468.01, 468.02, 468.03

[56] References Cited

U.S. PATENT DOCUMENTS

| | | | |
|---|---|---|---|
| 4,141,069 | 2/1979 | Fox | 364/493 |
| 5,111,391 | 5/1992 | Fields et al. | 395/209 |
| 5,224,034 | 6/1993 | Katz et al. | 395/207 |
| 5,255,181 | 10/1993 | Chapman et al. | 395/208 |
| 5,287,267 | 2/1994 | Jayaraman et al. | 395/210 |
| 5,299,115 | 3/1994 | Fields et al. | 395/210 |
| 5,440,480 | 8/1995 | Costanza | 395/208 |
| 5,446,890 | 8/1995 | Renslo et al. | 395/600 |
| 5,459,656 | 10/1995 | Fields et al. | 395/207 |
| 5,615,109 | 3/1997 | Eder | 395/207 |

OTHER PUBLICATIONS

STSC Inc.; Mar. 16, 1987. Acc. #00152990, File 621. "Optimal production planning . . . " by Bartmann, D.; Oct. 1983 Acc. #02301025 file #2.

*Primary Examiner*—Gail O. Hayes
*Assistant Examiner*—Gita Shingala
*Attorney, Agent, or Firm*—Fenwick & West LLP

[57] ABSTRACT

A demand forecasting and production scheduling system and method creates production schedules for various business items describing a forecasted demand for the business items in a number of future time intervals. The system includes a computer managed database of various profiles, including a base profile for each business item, and a number of influence profiles. The profiles describe variations in demand for the business item in a number of time intervals. The base profile describes an underlying level of demand for a business item that is anticipated for the business item absent any influencing factors, such as promotional sales, holidays, weather variations, and the like. The variations in demand for the business item due to such influence factors are stored in the database as influence profiles. The influence profiles may be either standard, percentage, or seasonal. The forecasted demand for a business item in a number of future time intervals is determined by selective combination of the base profile for the business item and any number of influence profiles. The forecasted demand is stored in the database in a forecast profile. From the forecast profile a production schedule is created, and the business item provided according to the production schedule. Actual demand for the business item is monitored and stored. The variation between actual demand and the forecasted demand is used to update the base and influence profiles. From the updated base and influence profiles the forecasted demand is redetermined, and the production schedule updated accordingly.

48 Claims, 6 Drawing Sheets

SYSTEM AND METHOD FOR ESTIMATING BUSINESS DEMAND BASED ON BUSINESS INFLUENCES

RELATED APPLICATION

This application is a continuation in part of application Ser. No. 08/023,111, filed on Feb. 26, 1993, now U.S. Pat. No. 5,459,656 entitled BUSINESS DEMAND ESTIMATION SYSTEM, incorporated by referenced herein, which is a continuation in part of application Ser. No. 07/808,982, filed on Dec. 17, 1991, entitled PRODUCT DEMAND SYSTEM AND METHOD which is a continuation application of Ser. No. 07/406,069, filed on Sep. 12, 1989, entitled PRODUCT DEMAND SYSTEM AND METHOD, all of which are commonly owned by the assignee.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND

1. Field of Invention

This invention relates generally to systems and methods for analyzing and predicting business demand based on historical demand and changes in actual current demand, and more particularly, to systems and methods that predict demand on the basis of combinations of numerous influence factors.

2. Background of the Invention

A typical business, such as a retail business, will offer various products for sale, such as foodstuffs, consumer goods, or the like. This type of business will attempt to supply its products in timely response to consumer demand. More generally, any business will require a series of various tasks, the number and timing of which depend on changes in demand for the business's offerings. In production planning for the business environment then, a tendency exists toward using production plans that are calculated on an infrequent basis. This basis is often daily at best, and it typically is based on average daily or weekly sales. This type of production planning results in excessive product and waste where demand is below production, or lost revenue where there is not enough production to meet customer demand. It is impractical, if not impossible, for a human being to calculate business demand on a more frequent basis such as hourly or every fifteen minutes, which would be more suited to determining varying business demand levels during daily operations.

In addition to the impracticality of computing business demand manually on a more frequent basis is the complexity introduced by different demand patterns for each day of the week, seasons of the year, or other recurring events, or due to other influencing factors. Customer foot traffic and product preferences are unique to each day of the week, and each week of the year. These traffic patterns and preferences are further complicated by seasonal trends that may span many weeks throughout the year. In addition, promotional programs, local events, holidays, and the like, all influence the demand levels faced by a business. Other events, such as limited sales events, influence demand in time periods less than a week or a day. Accommodating this level of complexity requires storing and using the past business demand according to a model that accounts for the influencing factor, such as the season, or day of the week, or other events or condition, as they occur in various time intervals during the business day. The model should cover each of a plurality of products or business items to determine future business demand for a specific location.

Another difficulty encountered once the past business demand has been stored is the ability to deal with incomplete data from current time periods and to compare trends in just-completed time intervals against projected demand in the equal time intervals in order to adjust the production or business item in near-future time intervals accurately and with confidence. One method for making such comparisons and projections on other near-future intervals is to take a simple positive or negative percentage of the trend of just-completed periods against projected periods and apply it to the remaining projected near future periods for the day. This method is unreliable given the many anomalies that can occur, for example, when variations in the weather cause more (or less) customers to patronize the business. Other methods which rely on historical demand to project future demand with such trend based analysis merely updates the projected demand in the future intervals based on the recent variations between projected demand and actual demand. However, such systems do not use these recent variations to change the data that was used to project demand in the first place, thereby failing to capture the variations in demand as they occur for use in subsequent forecasting.

The system and methods described in the related application employ an analysis of demand based on a business day model, and provide a useful and practical way of forecasting demand for products for a given business day. However, one limitation of the day model analysis is that the basic unit of modeling is a business day, so that all events that influence demand on a given day are assumed to influence demand throughout the entire day to some degree.

Because of the structure of that model, the day model less efficiently captures in a single model entity events or conditions that influence demand on either longer time scales, such as seasonal changes, or smaller time scales, such as temporary events (e.g. mid-day sales), changing weather conditions, or the presence or absence of a particular employee or other production resource for part of the business day. For example, individual day models may be created for a rain day and a Monday, and applied when its raining on Monday morning. However, if the rain stops, the combined profile for the day still forecasts demand based on a rain day model. Similarly, a day model is not advantageously used to determine if the number of staff on duty is an efficient number for the level of demand.

Accordingly, there is a need to generalize the day model analysis to a model that can capture such temporally variable business influences accurately. Individually modeled business influences can then be combined to form a given day model, or to create other models representing either shorter or longer periods of influence, such as temporary sales, or seasonal trends.

SUMMARY OF THE INVENTION

The present invention provides a system and method for analyzing business demand which incorporates tracking of past business demand for a plurality of products or tasks, time intervals during the day, and providing improved projection of business demand for such items. The system of the present invention uses the concept of a business influence to aggregate, store, access, and manipulate demand data for the purpose of forecasting future demand levels for one or more business items, using computer based data analysis and production management. A business influence is any type of quantifiable factor that produces a variation in demand for some type of business item.

The business influences model is composed of three distinct entities: a base profile, at least one influence profile, and a forecast profile. The base profile, influence profiles, and forecast profiles are data storage structures that persistently maintain their associated profile information in selected files in a database managed by a computer processor. The profiles are time-demand curves where demand is represented as either quantity or percentage units.

For each business item, a base profile in a base profile file is established using actual demand quantities from a sales data file containing sales data for the business item. The business item may be actual retail items, internal resources or production materials, raw goods, complex or simple tasks, or labor resources, such as employees. The base profile reflects the demand for a business item absent any known influences, such as the weather, sales, holidays, the season, or the like. The base profile can extend over a business day, or over a smaller or greater time period, and the data can be stored in any number of time intervals within the time period.

An influence profile reflects the changes in demand for a business item due to a particular identifiable condition, such as the weather, or a sale, or the like. Influence profiles are selected and combined with the base profile to create a forecast profile. The base profile and influence profiles are demand curves representing a particular level of demand for a business item in each of the number of time intervals. Influence profiles may be either standard, meaning the value of change is represented in units, or percentage, meaning that the value of change is represented in percentage terms. Seasonality influence profiles may also be created to represent the influence of long term seasonal influences.

The forecast profile is a projection of anticipated demand for a business item based on its base profile and any selected influence profiles or seasonality profiles, for a selected period. The selected period may be any useful time period, such as a business quarter, month, week, day, hour, minute, and so forth. In order to project demand then, a base profile for a selected business item is combined with any number of influence profiles to create a forecast profile. The forecast profile indicates the quantity of a business item to be produced, supplied, scheduled, or otherwise provided in each of the time intervals included in the base profile. The business item is then provided in the forecasted quantities in each of the time intervals.

Actual demand for the business item is then monitored and recorded. After the forecast period, the underlying base profile and influence profiles that were used to create the forecast profile are updated to reflect the difference between the forecasted profile amount and the actual demand, according to the degree or weighting that the various profiles (base or influence) contributed to the forecasted profile. A future forecast profile will then more accurately predict the future demand because it is based on both historical demand and recent variations in actual demand from the historical base levels.

The present invention thereby overcomes the limitations of prior art systems by correctly allocating between the percentage influence profiles and the standard and base profiles the amount of error that these profiles contributed forecasted profiles, and within each type of profile, standard or percentage, allocating to each its relative contribution to the error in a self correcting and stabilized manner. This increases the accuracy of subsequent forecasts since the base profile and influence profiles on which the forecast profile is made are updated to reflect the correctly allocated demand variations.

The present invention further provides a powerful analytical tool for determining what factors influence demand and by how significant the factors are over specific time intervals. This benefit arises where the user defines influence profiles without specifying the data values to be used in the profile. The forecasting process of the present invention adaptively determines the data values over time. This allows the business to subsequently review the defined influence profile to determine the impact, if any, the specified influence or factor has on business demand.

DETAILED DESCRIPTION OF THE INVENTION

System Configuration

Figure 1:
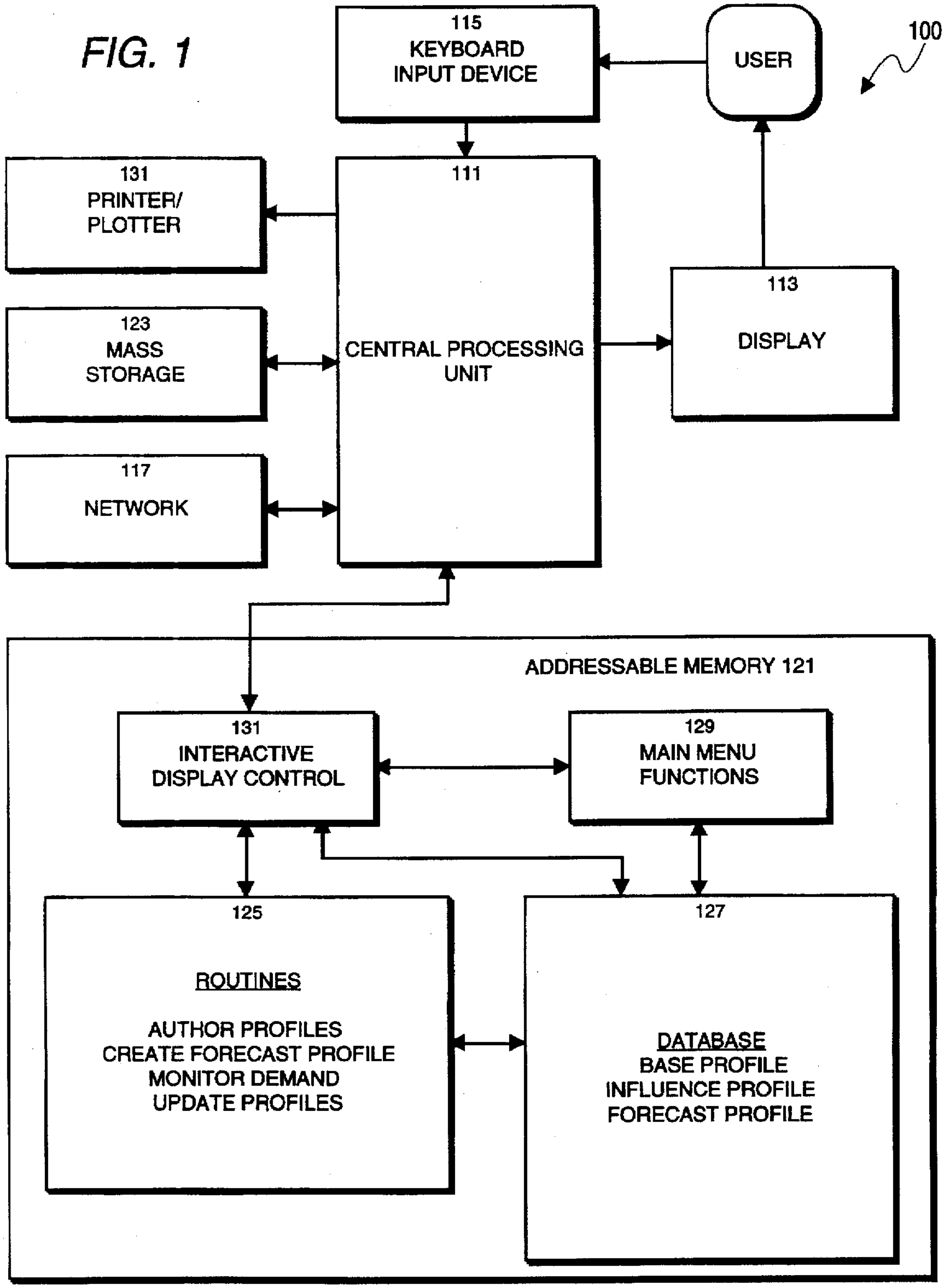
FIG. 1 is a block schematic diagram of a workstation for estimating business demand in accordance with the present invention.

Referring now to FIG. 1, there is shown a block schematic diagram of a system 100 configured in accordance with one embodiment of the present invention to provide improved demand projection and production scheduling for a plurality of business items. Business items can include any type of trackable, quantifiable product or service that a business produces or consumes. Business items include products, services, or resources for sale or internal use in the further production of other products or services. For example, business items include not only the retail products that a store offers, but also its staffing requirements, the quantity or costs of raw materials and supplies, and production tasks involved in producing its products, such as discrete manufacturing steps, restocking inventory, ordering more supplies, and the like. Any production task which has an identifiable starting point, duration, and frequency can be evaluated by the system.

In FIG. 1, a central processing unit (CPU) 111 is connected to control the display device 113 in response to inputs supplied to the CPU 111 via the user's manipulation of the keyboard 115, or via other inputs supplied through a conventional network interface 117 (e.g., modem, bar-code readers, standard network bus, and the like). The CPU 111 accesses memory 121 which contains information that is supplied via the keyboard 115 or the network 117 (e.g., RS232 bus connection to a point-of-sale terminal or a host computer), or is transferred thereto in conventional manner from mass storage medium 123. The memory 121 contains instructions for executing routines 125 on information that is stored in database 127 according to the present invention, as further described below. The memory 121 also includes main menu functions 129 which allow the user to select and operate routines 125. Memory 121 further includes a buffer storage or interactive display control 131 for synchronously displaying lines of data bits on display device 113 in conventional manner. Permanent records and periodic reports of business item data may be plotted or printed on printer 131 under control of the CPU 111.

In accordance with the present invention, database 127 contains a number of files for gathering, storing, and manipulating data relating to demand for business items and the production and scheduling used to supply business items in response to such demand. Database 127 includes a base profile file 22, a sales data file 34, an actual demand data file 15, a sales definition file 32, a forecast profile file 24, an influence profile file 26, a business day model file 30, and an influence group file 28.

The files in database 127 are accessed and modified under control of the CPU 111 in response to routines 125 such as author base profiles and influence profiles 301, create forecast profile 303, monitor actual demand 305, and update profiles 307, as described later herein, for controlling the display on display device 113 of directions to a user for projecting quantities and schedules for business items to be produced by the user during the prescribed time intervals throughout the day.

System Process Flow

Figure 2:
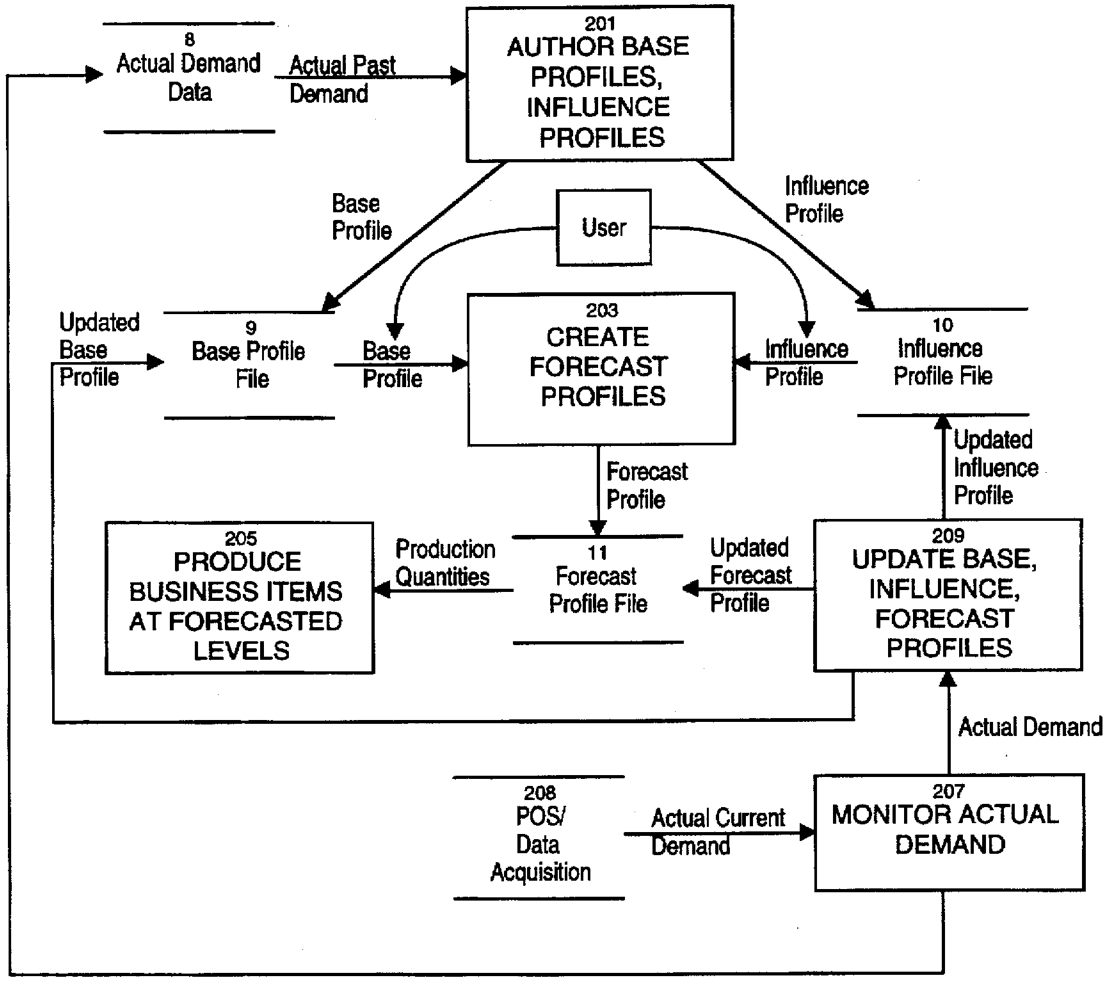
FIG. 2 is a transactional dataflow diagram of the overall process of estimating business demand in accordance with the present invention.

FIG. 2 shows a transactional dataflow diagram of the process of projecting future business demand levels for a plurality of business items based on historical demand data, projected total future demand, and current demand levels.

The user authors 201 a plurality of base profiles and influence profiles that describe the relationships between the business items, time intervals, and actual demand data. The base profiles and the influence profiles are drawn from an analysis of actual demand data in the actual demand data file. 15 which stores the demand for the item on an interval basis. The user may additionally chose to author variables describing production capacity and staffing requirements of the business location, along with other location specific or relevant production variables.

The user selects a business item to be produced or scheduled during some time interval. The selection of a business item, and subsequent forecasting may be repeated for multiple business items. The user selects a base profile for the business item and any number of influence profiles. In a preferred embodiment the business item is associated in the system 100 with a base profile, and selected influence profiles, so that selection of the business item results in automatic selection of the profiles. In a preferred embodiment, each business day is associated with at least one base profile and influence profile that captures the variations in demand patterns which effect each demand for a business item associated with the base profile. The system 100 creates 203 a forecast profile from the selected base and influence profiles. The forecast profile indicates the actual quantity of the business item that the user should produce, schedule, or Otherwise provide, in each of the projected intervals covered by the forecast profile.

The user then schedules and produces 205 the business item according to the forecast profile. The user may employ conventional scheduling procedures to produce the business item, since most business items or tasks cannot be produced instantly, but rather require a certain amount of time to complete. The system 100 may provide such scheduling procedures, and assist in the production process, such as the determination of a task schedule, or the computer aided control of production, or the like.

The system 100 monitors 207 the actual demand for the business item, preferably storing data for such demand for the business item in each of the time intervals corresponding to the base profile in the actual demand data file 15. This actual demand data for a business item is used to update 209 the base profile, and the influence profiles associated with the business item. In the preferred embodiment, these profiles are updated 209 after the completion of the forecast period. Alternatively, the profiles may be updated 209 during the forecast period. Future forecast profiles will then be made 203 using the updated base and influence profiles.

Database Organization

Figure 3:
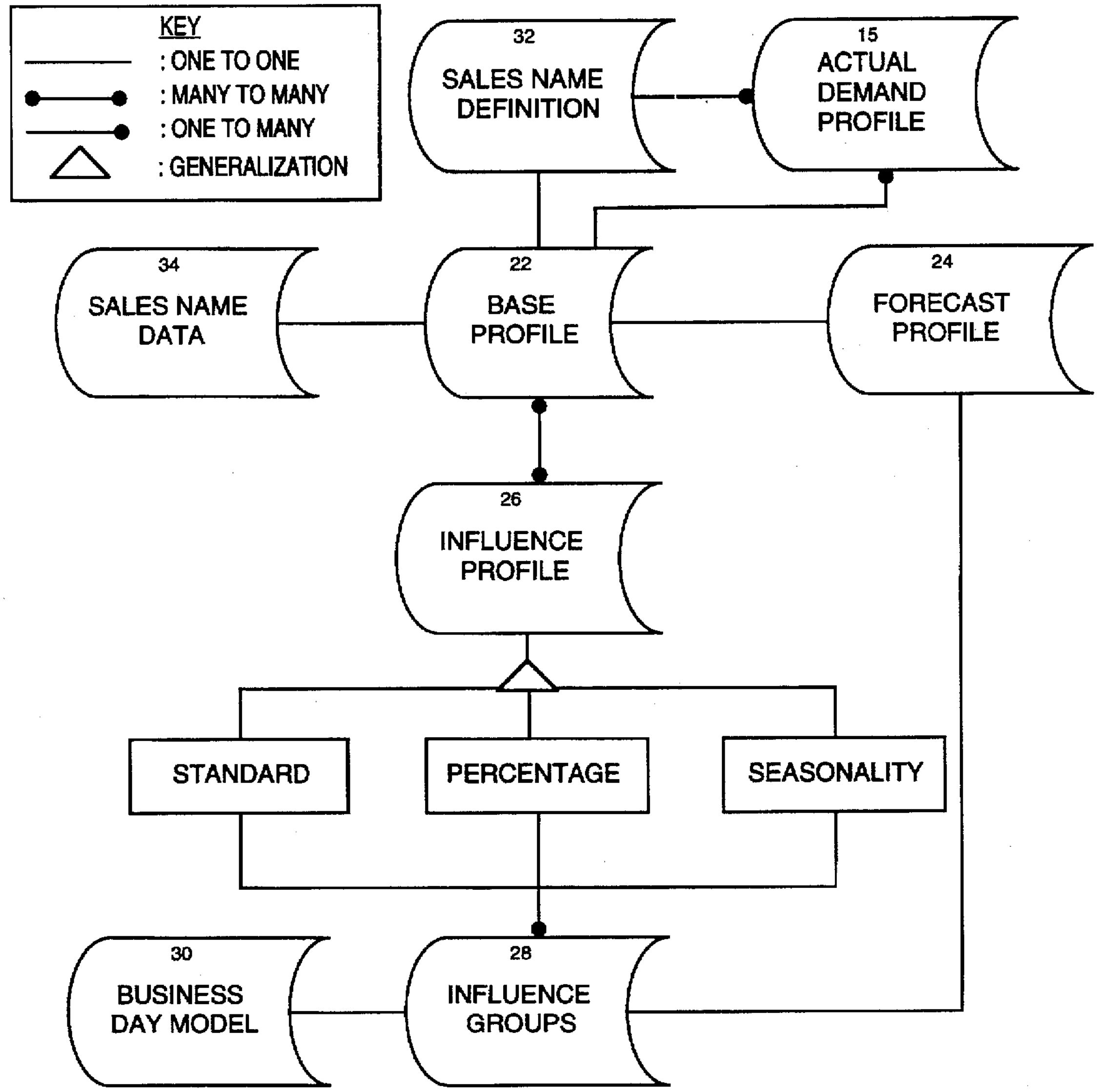
FIG. 3 is an object model of the database used in the present invention.

Referring generally now to FIG. 3, there is shown an object model of a preferred embodiment of the database 127 and the files contained therein for employing the above described processes of the present invention. The various files in database 127 and their associations are described below. Appendix A includes a database schema of the preferred embodiment of the database files stored in database 127. The database file definitions for all files in Appendix A illustrate only one embodiment of the invention herein, and it is understood by those of skill in the art that various changes could be made to the database definitions while remaining within the inventive concept. Such changes include variations in the selection of attributes for primary, secondary, alternate, or foreign keys, or in the use/definition of various attributes to ease administration of the system, such as comments, descriptions, locations, departments, local identifiers, host identifiers, downloaded flags, and the like.

A base profile for each business item to be forecasted is stored in a data base 127 in the base profile file 22. In Appendix A, base profile file 22 is named "base_profile." In the preferred embodiment, the base profile stores a historical exponentially smoothed average of actual demand for the item in each of a variable number of time intervals. In alternative embodiments, the base profile stores a moving average of actual, a forward trend average, or other types of historical averages.

In a preferred embodiment, each base profile includes:

- a category identifier of the type of item the base profile applies to, such as a product category, e.g. "baked goods". The category identifier can be either a numerical or string value;
- an item identification value, which is a unique value within the category specified for the base profile, and identifying the item to which the base profile applies;
- a units value specifying the appropriate units of measurement for the item, such as a simple quantity unit (or count, as above), a mass unit (e.g. kilograms), a volume unit (e.g. liters), or a monetary unit (e.g. dollars); and
- a set of data values which are the historical, exponentially smoothed values in each time interval of the base profile.

The data values in the base profile (and the influence profiles) represent actual entities, the business items, and the level of historically experienced demand for that business item. The data values thus represent an identifiable, trackable, physically manifested phenomenon, the demand for a business item. This demand may be manifested through consumer purchases, labor needs, resource allocations, and the like.

A base profile covers any number and length of the time intervals that are capable of being modeled, rather than merely a single day. Accordingly, in a preferred embodiment, the base profile further includes attributes to describe the relevant time-related features:

a time value specifying the start of the first time interval of the base profile. This value is used to indicate to what part of a business day the base profile is to apply. For example, a base profile for modeling increased business during the evening dinner hours can be specified to begin at 5:00pm in the afternoon;

a time interval value specifying the length of each time interval in the base profile. This allows different base profiles to have varying time interval lengths, as may be appropriate to the type of entity, event, or condition being modeled. For example, for a relatively slow selling item a longer interval value may be appropriate, or for a high volume item, a very short interval may be appropriate to capture rapid fluctuations in demand; and a number of periods value specifying the number of time intervals included in the base profile.

Finally, each base profile in base profile file 22 is to be updated by the CPU 111 with actual demand levels on some periodic basis, averaging the actual demand, from the actual demand file 15, for the item during the overall length of the base profile with the demand levels stored in the base profile in the base profile file 22. The updating process is performed by the update profile process 307, and updates a given base profile by incorporating and exponentially averaging a certain percentage of previous historical demand, and a certain percentage of actual demand. Accordingly, in the preferred embodiment, each base profile includes:

a weighting factor, which specifies a decimal value used to update the base profile with actual historical demand quantities in the actual demand file 15; and a date value for tracking the date of a last update to the base profile.

For example, a base profile for a retail fast food establishment may look like this:

| | |
|---|---|
| Category: | Bakery |
| ItemId: | 52 |
| Description: | Macadamia Nut Cookie |
| Weight: | .28 |
| UpdateDate: | 12/30/95 |
| StartTime: | 11:00 |
| PeriodLength: | 900 seconds |
| PeriodFlag: | 1 (map to open hours) |
| Units: | Each |
| Data: | [23, 25, 12, 24, 12, 23, . . . 10, 3, 1] |

This base profile describes a bakery product at the retail fast food establishment. The category of "bakery" is useful to allow categorization, subtotaling, and other accounting uses for determining total sales, counts, and the like. The item id is useful to distinguish this particular item and base profile from others in the same category. The business item is macadamia nut cookies, a consumable, perishable good. The weighting factor is 0.28, meaning that when the base profile data is updated, 28% of the updated value will come from the actual demand data received during a monitored time interval, and 72% will come from the base profile itself prior to the update. The last time the profile was updated was Dec. 30, 1995. The base profile begins for time intervals starting at 11:00am, which may be the hour the business opens, or any other start time. The length of each time interval is 900 seconds or 15 minutes. The short period length is useful because the time required to make the cookies is relatively short, and the demand for them may change dramatically over relatively short intervals, such as in the four 15 minute intervals during the typical lunch hour.

The period flag indicates that the number of time intervals in the profile, and hence, number of entries in the data extension. A period flag of "1" indicates that the intervals are to be mapped to the open business hours. Thus, the number of time intervals will be the number of seconds in the open hours, divided by 900, the specified period length. The demand for the cookies is stored in terms of actual units of cookies, as opposed to kilograms, or dollar value of cookies sold. The data extension is thus interpreted in light of the foregoing attributes, and represents a base level of demand of 23 cookies demanded between 11:00am and 11:15am, 25 cookies demanded between 11:15am and 11:30am, and so on, until the close of business, when only 1 cookie was demanded in the last 15 minute interval.

As another example, the base profile for a service business may look like this:

| | |
|---|---|
| Category: | Hair Care |
| ItemId: | 28 |
| Description: | Men's Haircut |
| Weight: | .50 |
| UpdateDate: | 12/30/95 |
| StartTime: | 9:00 |
| PeriodLength: | 3600 seconds |
| PeriodFlag: | 1 (map to open hours) |
| Units: | Dollar |
| Data: | [25, 10, 35, 60, 40, 45, 5, 10, 15, 15] |

Here, the base profile is for a hair salon, and so the category is "hair care" services. The particular business item is a men's haircut, which is not a good, but rather a service performed. The weighting factor of 0.50 indicates that 50% of the updated base profile will come from the existing values in the base profile and 50% will come from actual demand experienced in a forecasted so period. The start time is 9:00am. The period length is 1 hour, since demand for haircuts fluctuates more slowly than cookies, or because the business does not need any finer grained forecasting. The period flag again maps to the open business hours, which may be 9:00am to 7:00pm. The units here are dollars, that is, the sales value of the haircuts in each interval. The data extension then shows the sales of haircuts throughout the business day, from 9:00am to 7:00pm.

The base profiles, as described, provide storage structures for tracking and updating a base level of demand for a given item. In order to develop forecasts for an item resulting from specific events, conditions, seasons, or other business influences, the base profile for an item is combined with any number of selected influence profiles. There are three types of influence profiles: standard influence profiles, percentage influence profiles, and seasonality influence profiles. A standard influence profile describes quantity changes to be applied to the base profile. Percent influence profiles describe percent changes to be applied to a base profile. The influence profiles are stored in database 127 in an influence profile file 26. Appendix A includes the preferred database definition of the influence profile file 26 as file "influence_profile." FIG. 3 illustrates the association between the base profile file 22 and the influence profile file 26.

The influence profiles have some of the same attributes described above for the base profiles, specifically, the weighting factor (for updating the influence profile), the last update date, the starting time interval, the length of time interval, the unit type, and the data values. In addition, each influence profile includes an attribute that identifies the base profile in base profile file 22 to which the influence profile applies. In preferred embodiment, this attribute may be a foreign key to an identifier attribute of a base profile or the like. In addition, an influence profile may be applied to any base, regardless of the category type. FIG. 3 illustrates this in that a given influence profile may apply to any number of base profiles.

For example, a standard influence profile to describe the impact of rain conditions on demand for an item that is tracked by units would indicate an increase or decrease in the number of items in each time interval of the base profile. Here is an instance of one such influence profile, which indicates the influence of rain on the demand for cookies:

| | |
|---|---|
| Description: | Rain |
| Weight: | 75 |
| UpdateDate: | 12/30/95 |
| StartTime: | 11:00a |
| PeriodLength: | 3600 seconds |
| PeriodFlag: | 1 |
| Units: | each |
| Data: | [−10, −5.1, −2.3, −1, −0.9, 1.5, . . . 2.5, 5.3, 4.3] |

Here, the extension of the data attribute is a numerical increase or decrease in the actual count of cookies sold in each of the periods.

A percentage influence profile that describes the impact of rain in percentage changes in demand, may have similar attributes as illustrated here, but have a data extension like this, for example:

percent1_inf.data=[−45, −15, −10, 0, 5, 8, . . . 2.3, 5.4, 4.3]

which describes a 45% decrease in a first time interval, a 15% decrease in the second time interval, a 10% decrease in the third time interval, and so on, in subsequent time intervals.

Finally, the other remaining type of influence profile is a seasonality influence profile. The seasonality influence profile is used to adjust the forecast profile for a business item for the lag time that is typically present in systems that use exponential averaging. In a preferred embodiment, the seasonality influence profile has a starting date value which indicates the beginning of the season, and either a length value, preferably in days, or an ending date value. In either case, the seasonality influence profile is applied to those forecast profiles that are created during the applicable time period. The seasonality influence profile is also stored in the influence profile file 26.

The foregoing examples are illustrative of the basic idea of the base profile, and show that the base profile, as well as the influence and forecast profiles, are used to represent demand experienced by a business for actual goods or services, or similar business items over a selected number of time intervals.

In the preferred embodiment, various influence profiles can be associated together as a influence group, allowing them to be applied jointly to a base profile. This is preferably done using an attribute in the influence profile file 26 as a foreign key to a specific influence group in a influence group file 28. Appendix A illustrates the preferred embodiment for an influence group file 28 called "influence_group".

Additionally, the equivalent of a day model may also be created in database 127 by specifying selected influence groups to be used jointly in defining the demand for a number of different business items. The selected influence groups are identified in a business day group file 30. An example of business day group file 30 is shown in Appendix A as the "business_day_model" file.

As stated, a base profile is combined with one or more influence profiles to create a forecast profile of the anticipated demand for the business item. The forecasted demand is stored in a forecast profile file 24. In Appendix A, the forecast profile file 24 is "forecast_profile." As the forecast profile reflects a future anticipated state of the base profile, the forecast profile includes attributes that associate it with a base profile, including its units, time periods, and the like, and with selected influence profiles. The forecast profile preferably includes a base profile identifier, that directly, or indirectly, associates the forecast profile with a base profile; a forecast date attribute, indicating the date that the forecast applies to; and a list of the influence profiles from the influence profile file 26 that were used to create the forecast. Additional desirable attributes include attributes to identify the starting time interval of the forecast, and the length of each interval, A data value attribute stores the forecasted demand in each time interval in the forecast profile.

Data related to the actual demand values is stored in several different files in database 127. The sales definition file 32 contains the identification and definition of each business item that the user desires to track and forecast. The sales data file 34 contains various total actual values for a given business item on a single specified date, and values for previous years performance. The periodic totals comes from the actual demand data file 15, which stores the actual demand levels for a business item in each of plurality of time intervals one a given date.

System Operations

Profile Authoring

Referring again to FIG. 2, the base profile and influence profiles are authored 201 by the user to identify and describe the desired business influences that impact demand for a given business item. More particularly, the user specifies the attributes of a base profile or influence profile in the respective data base 127 files, base profile file 22 and influence profile file 26, such as the item description, unit type, beginning time interval, and the so forth.

More particularly, to author the base profile in the base profile file 22, the user specifies the identity of the business item, either through item type and item identifiers as in the preferred embodiment, or through some other mechanism that uniquely identifies a given item. The user may optionally include a description of item for future reference, particularly by other users of the system 100. The user further specifies the relevant period information, such as the time of the first interval, and the length of each interval, and the number of intervals. In the preferred embodiment, the user choose to have the system 100 automatically determine the number of intervals by dividing the operating business hours by the length specified for each interval. Alternatively, the user may manually specify the number of intervals for base profiles adapted to longer or shorter periods than a business day. The user further specifies the units of the base profile, such as counts, currency units, volume units, or mass units. The user also specifies a weighting value that determines the relative percentages for updating the base profile with the influence profiles and actual demand data. Once the relevant data for the base profile is entered, the system 100 will retrieve from the actual demand file 15 actual historical demand data for the identified item over a number of dates, and will compute the base profile data values, exponentially averaging the actual demand data over time. The data values are then stored in the base profile file 22.

The user authors influence profiles in a similar manner, with the system 100 storing the resulting influence profiles in the influence profile file 26. The user indicates whether the influence profile is a standard, percentage, or seasonality profile. The data extension for the influence profile may be based on historical data from other business locations having similar operations. The data extension may also be estimated, or randomly assigned. Alternatively, the data extension may be left empty.

The user may additionally choose to create influence groups and business day groups, specifying the individual influence profiles in each, but these are not necessary to practice the invention.

Creating a Forecast Profile

The base profiles and the influence profiles are used in the process 203 of projecting, or forecasting, demand for selected business items in a selected set of time intervals through the creation of forecast profiles.

Figure 4:
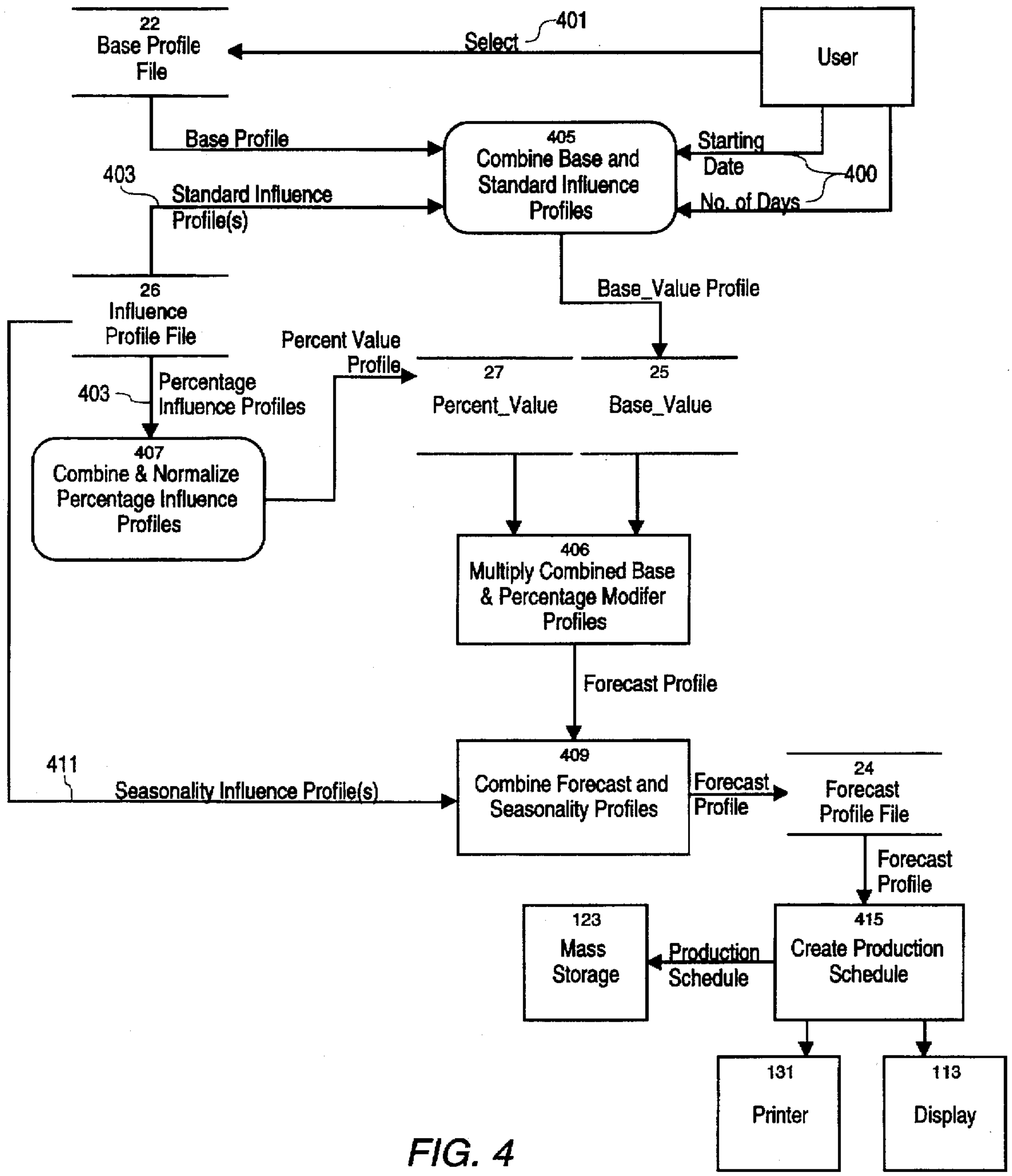
FIG. 4 is a data flow diagram of the data transformation during the forecasting process.

FIG. 4 shows a data flow diagram of one embodiment of a method for forecasting business demand using base profiles and influence profiles. The method will be described with respect to forecasting for a single business item, but it is understood that the method could be applied repeatedly for any number of business items. A user selects 400 a starting date for the projected interval, and a number of days to be projected. A base profile is selected 401 for forecasting, for example, selecting the base profile of a product, such as cookies, or a resource, such as the employees, or a task, such as preparation of a product. As stated s above, the base profile specifies the demand for the business item as measured in either numerical, physical, or currency units.

Once the base profile is selected, the influence profiles that are associated with the base profile are retrieved 403 from the influence profile file 26; this includes any standard and percentage influence profiles. Retrieval can be done through the appropriate SQL selection operations (or the like) on the influence profile file 26 and base profile file 22, using, for example, a foreign key to the base profile file 22, or indirectly via the influence group file 28. The base profile and influence profiles can also be selected from the business day group file 30, each business day group being comprised of influence groups, as described s above. Multiple base profiles may be selected for projecting demand for various different items, on numerous days.

A forecast profile is created and stored in the forecast profile file 24 for each base profile, as follows. The base profile and all the standard influence profiles associated with it are combined 405 at each data value to produce a base value profile. Expressed in vector notation, the data extension of the base value profile is:

$$\text{base\_value.data}_i = i = 0 \xrightarrow{\hspace{4em}} m \quad \sum_{j=0}^{n} \text{std\_pro}_{i,j} + \text{base\_pro}_i \qquad \text{Eq. 1}$$

where "std_pro" is a standard influence profile, "base_pro" is the base profile, j iterates over each standard influence profile, and i iterates over each data element (vector component) of the profiles, from the $0^{th}$ to $m^{th}$ elements. Since the standard influence profile reflects the numerical change in the demand for the business item, combining the standard and base profile results in the anticipated demand just from the standard influence profiles. It is to be noted that in this equation, and all that follow, only the data attribute extension of the profiles is shown for convenience, and thus the examples are similarly limited to showing on the extension of the data attribute. Accordingly, data attribute extension of such examples would in practice be part of a completely defined profile, and interpreted and understood in light of the other attributes defined in each profile, such the item name, profile description, units of the data extension, the number of time intervals covered by the profile, the length of the time intervals, and the so on.

For example, assume a base profile for a business items with a data attribute extension such as:

base profile.data=[600, 4.5, 4, 4, 4]

and standard influence profiles for rain and a normal Monday as:

rain_std_pro.data=[200, −1.1, −1.3, −1, −0.9]

monday_std_pro.data=[200, 2, 0, 2, 1]

Then the base value equals:

base value.data=[1000, 4.4, 2.7, 4.0, 4.1]

If no percentage influence profiles are present, then the combined standard influence profiles and base profile, the base_value profile, is the forecast profile.

Where there are percentage influence profiles, the forecast profile is adjusted with these also. The percentage influence profiles cannot be directly combined with the base value profile because the units of the profile are different, the percentage influence profiles being expressed as percentages, the base value profile in other units, Such as mass, quantity, or currency. In the preferred embodiment, the data values in the percentage influence profiles are stored as decimals, though they may be stored in other formats as well. In Appendix A, the data values for percentage influence profiles are stored as short integers, and thus the percentage influence profiles are convened to a decimal form by dividing them by 100, for combining with the base value profile. This conversion is not shown in the equations herein. The retrieved percentage influence profiles are combined 407 into a single percent value profile, which is normalized to multiplicative values by adding 1 to each data element in the single percent value profile:

$$\text{percent\_value.data}_i = i = 0 \xrightarrow{\hspace{4em}} m \quad 1 + \sum_{j=0}^{n} \text{percent\_pro}_{i,j} \qquad \text{Eq. 2}$$

Here, "percent_pro" is an individual percentage influence profile. In other embodiments where the percentage influence profiles are stored directly as decimals such conversion is unnecessary.

Continuing the above example, assume two percentage influence profiles:

percent_pro1.data=[45, 0, −10, 0, −10]

percent_pro2.data=[−10, 1, 4, −4, −6]then:

percent_value.data=[1.35, 1.01, 0.95, 0.96, 0.84].

The percent value profile may then be applied 409 to the base value profile to obtain a forecast profile, by multiplying each data value in the base value profile by a corresponding data value in the percent value profile:

$$\text{forecast.data}_i = i = 0 \xrightarrow[\text{base\_value}_i \,*\, \text{percent\_value}_i]{} m \quad \text{Eq. 3}$$

Thus with the foregoing exemplary profiles, the data attribute extension of the forecast profile is::

forecast.data=[1350, 1.01, 0.95, 0.96, 0.84].

The forecast profile is then adjusted with any seasonality influence profiles, by retrieving 411 those seasonality influence profiles with a specific date or date ranges that match or include the date for the forecast profile as selected 400, and combining 413 the data values of the seasonality influence profile with the forecasted profile:

$$\text{adjust\_forecast.data}_i = i = 0 \xrightarrow[\text{season\_pro}_i + \text{forecast\_pro}_i]{} m \quad \text{Eq. 4}$$

Thus, if there is a seasonality influence profile:

season_1.data=[−75, 0.12, 0, 0, 0]

then the adjusted forecast profile equals:

adjust_fore_prof.data=[11235, 4.574, 2.565, 4.8, 4.284]

This adjusted forecast profile is stored as the forecast profile in database 127 in the forecast profile file 24, which, as indicated above includes attributes identifying the date(s) forecasted, the base profile being forecasted, the influence profiles used in forecasting, the time period of the first interval, time interval length, and forecasted values. This process may be repeated for any number of base profiles.

From the forecast profile, the system 100, via the processor 111, produces 415 a production schedule indicating the forecasted demand in each of future time intervals covered by the forecasted profile. The production schedule is preferably stored in the mass storage 123, and may be output on either the display 113, the printer 131, or both, as necessary.

Producing the Forecasted Business Items & Monitoring Actual Demand

Referring again to FIG. 2, after the forecast profiles have been obtained, and the production schedule created 415, the business items are produced 205 in accordance with the forecasted demand levels in the production schedule. Production typically requires various physical resources such as ovens, printing presses, or other machinery, or even shelf or floor space, and some amount of labor. In a retail store for example, production may mean stocking the forecasted number of business items, here retail consumer goods, on display shelves, according to the quantity of the business items forecasted, and at the various future time intervals specified in the production schedule. In such a retail store where variations in demand need only be accommodated by re-stocking, the production schedule may detail the forecasted quantities of business items for each day of the week, so that appropriate quantities may be ordered if necessary, and labor scheduled to restock inventory as necessary to meet the forecasted demand.

Likewise, for a retail store providing consumables, such as a fast food restaurant, production would include making the business items (e.g. cookies, hamburgers, tacos, and the like) in the forecasted quantities at the specified future time intervals. In this type of retail environment, demand fluctuates significantly throughout the day, and there is a need to provide the business items, which are perishable, only at or about the time when demand is forecasted. Accordingly, in this environment, the production schedule of forecasted demand is particularly useful, and would indicate in hourly, quarter-hourly, or other useful interval, the quantity forecasted for each business item offered by the establishment. In addition, the production schedule may be used interactively such an embodiment to provide employees of the business with the forecasted demand levels at some predetermined amount of time prior to the forecasted demand interval so that the business item may be produced in time to meet the forecasted demand.

In a service business, production may mean providing sufficient employees and working materials to produce the forecasted level of services. For example, a beauty salon that provides various cosmetic services may forecast the number of haircuts, permanents, nail manicures, and the like, for a given day or week, and further forecast both the number of employees needed to perform such services, and the amount of underlying materials (hair dye, shampoo, nail files etc.) needed to provide the services. The production schedule would be used in this instance to determine the proper level of staffing, ordering of supplies, and the like.

Similarly, a bank may forecast the number of deposits, transactions, loans, and the like, demanded during a given week, and use the production schedule to schedule its employees accordingly. A bank or brokerage firm may also forecast other intangible business items, such as stock prices, futures contracts, currency fluctuations, interest rates, and other financial instruments.

As the foregoing examples illustrate, production 205 is not limited to mere manufacturing of a business item. In addition, the production schedule provides a useful means of communicating the forecasted demand in the forecast profile to the employees of the business so that appropriate actions may be taken, employees scheduled for work, materials or resources ordered, purchased, and allocated, and so on.

As the business continues to operate through the forecasted time intervals, whether it is a part of business day, an entire business day, or some longer period, actual demand for the business item is monitored 207 and stored in an appropriate data file in database 127, such as actual demand data file 15. In the preferred embodiment the actual demand data file 15 includes attributes that identify the date demand was monitored, the type or category of item, the starting point of the first time interval of actually monitored demand, the units of the demand, and the actual demand data values themselves in each of the time intervals included in the base profile. Appendix A illustrates the preferred database definition of the actual demand data file 15 as "actual_demand."

Actual demand for items that are produced may be monitored by point of sale devices 208 that individually track demand of the business items, including total amounts, such as total quantities, volumes, or sales. Actual demand for other business items, such as production resources, labor resources, and the like, may also be monitored through appropriate measures, such as a manager entering current hours for employees, number of production resources employed, or automatically, such as through time entry systems, data acquisition systems coupled to the production resources, and the like. In any of these cases, the number, quantity, or sales of the business item is stored in the actual demand data file 15 for subsequent use in updating the base and influence profiles in their respective database files.

Updating the Base Profile, Forecast, and Influence Profiles

From the actual demand, the base profile is updated 209 to increase its accuracy when used in subsequent forecasting 203 processes. The updating process is a complex analysis that determines relative impact of the base profile, influence profiles, and currently received actual demand figures on the forecast profile, and allocates that impact to each profile in order to update it.

The updated values to the base profile are constrained by a maximum value and minimum value (max_update, and min_update). The maximum value prevents the base profile from being to heavily influenced by extreme values of actual demand that may result from unusual or temporary circumstances. The minimum update value is a destabilizing factor that prevents the components of the base value profile, or any other profile from remaining fixed at, or near 0, which would prevent, or impair any updating to the profile. For example, a maximum value of 0.3 and a minimum value of 0.01 specify that the data attribute extension of a base profile can change at most 30% and at least 1% in a single updating process. Other maximum and minimum update values may be specified by the user, depending on the particular application domain, and business item being tracked and forecasted.

The base profile file 22 is read to determine the dates of the last update of each base profile therein, where this information is stored as an attribute in the s base profile file 22. The base profiles that do not have current updates, as determined by a user defined parameters, are selected for updating. Alternatively, where actual demand data is concurrently maintained for individual business days, any unposted day can be identified, and the base profiles used during the unposted day retrieved from the base profile file 22.

Each base profile is updated as follows. Generally, there is a difference between the forecast profile, the level of demand that is forecasted for a business item, and the actual demand. This difference is a total error, here called the delta vector. Because the forecast demand is a function of the base profile and the influence profiles, how much the base profile contributed to the total between the forecast demand and the actual demand is determined. This is done by taking the base profile as a percentage of the combined absolute values of the base profile and the standard influence profiles. If this percentage is greater than the minimum update value, then it is multiplied by the delta vector to create a delta base profile; otherwise the delta base profile is just the minimum update value multiplied by the delta vector. This means the delta base profile will reflect the greater of the minimum update level or the amount of influence that the base value profile has on the overall combined profiles. This delta base profile is then used to update the base profile by weighting the delta base profile by the weighting factor for the base profile and combining it with the base profile.

This updating process is applied in a similar manner to the standard influence profiles and the percentage influence profiles. For these influence profiles, the relative contribution to the total error or delta vector is of each of these types of profile is determined, and then allocated to the individual influence profiles in a stable manner.

Figure 5A:
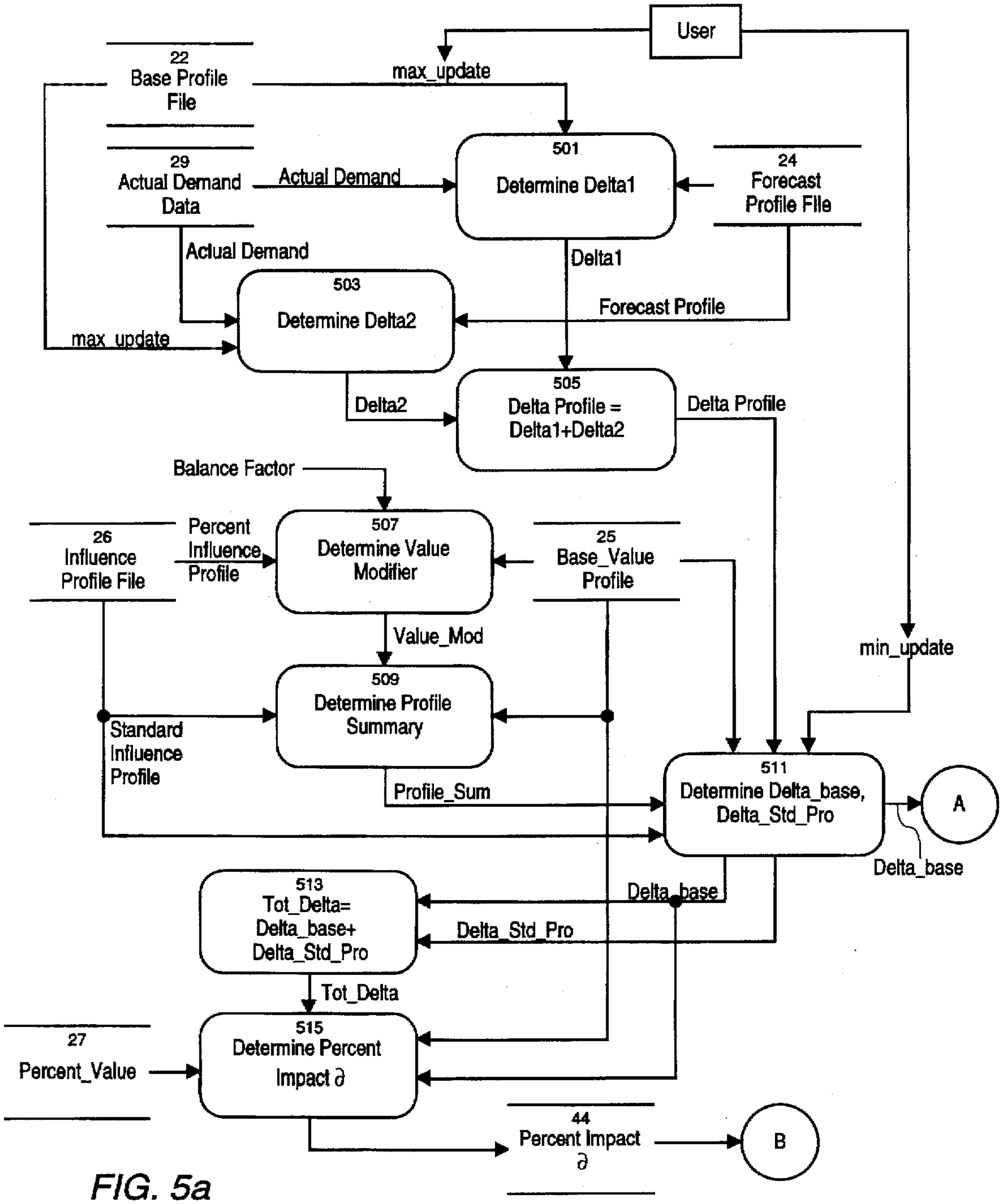
FIGS. 5*a* and 5*b* are a dataflow diagram of the data transformation during the updating process.

One method for updating the base profile is illustrated in the dataflow diagrams of FIGS. **5*a* and 5*b*. Referring now to FIG. 5*a*, first, one portion of the delta vector is determined 501**, for those actual demand values that are not constrained by the max_update value. This vector, $\text{delta1.data}_i$, equals:

$$\overset{i=0 \longrightarrow m}{(\text{actual\_dem}_i - \text{forecast}_i) * \left( \left| \frac{\text{actual\_dem}_i - \text{forecast}_i}{\text{forecast}_i} \right| < \text{max\_update} \right)} \quad \text{Eq. 5}$$

Delta1 reflects that part of the difference between actual and forecast demand that is less than the maximum allowed updating value. In other words, this is the total error vector between the forecast demand and the actual demand, as limited by a maximum value. Each data value in the total error vector includes a first error component attributable to the base profile, a second error component attributable to the standard influence profiles, a third error component attributable to the percentage influence profiles, and a fourth error component attributable to the seasonality influence profiles. The updating process determines the magnitude of each of these components, and more particularly for each of the influence profile components, determines the contribution of each individual influence profile to the error component for that type of profile.

Thus continuing the above example, if max_update equals 0.3, then:

delta1.data=[−1150, 0, 0.435, −0.8, 1.216]

Next, a second portion of the delta vector is determined 503, for those actual demand values that are constrained by the max_update value. This vector, delta2, equals:

$$\overset{i=0 \longrightarrow m}{\text{max\_update} * \text{forecast}_i * sign(\text{actual\_dem}_i - \text{forecast}_i) * \left( \left| \frac{\text{actual\_dem}_i - \text{forecast}_i}{\text{forecast}_i} \right| \geq \text{max\_update} \right)} \quad \text{Eq. 6}$$

Thus, where min_update equals 0.01, then:

delta2.data=[0, 1.636, 0, 0, 0]

In other words, the data values of delta2 are the error values as adjusted by the maximum updating value.

The delta vector (or "delta profile") is then determined 505 as the vector sum of delta1 and delta2:

$$\text{delta.data}_i = \overset{i=0 \longrightarrow m}{\text{delta1}_i + \text{delta2}_i} \quad \text{Eq. 7}$$

In the current example:

delta.data=[−1150, 1.636, 0.435, −0.8, 1.216]

This is the total adjusted error vector. In the preferred embodiment the delta vector is determined in a single step, but shown here in three steps for clarity.

The impact of forecasted values on the standard influence profiles versus the impact on the percentage influence profiles is adjusted so that each is equally effected by the difference between actual and forecasted values. This is done by a balance factor chosen by the user. In the preferred embodiment, a balance factor of about 2 is chosen. In the absence of a balance factor, there may be disproportionate change in one type of profile as compared to another. In addition, the balance factor allows the correct level of impact of influence profiles on the base value profile to be determined.

Accordingly, the impact of all percentage influence profiles on the base value profile, in the units of the base value profile, in determining the forecast is determined 507 as a value modifier:

$$\text{value\_mod.data}_i = \xrightarrow[\text{base\_value}_i \, * \, \text{balance\_factor} \, * \, \sum_{j=0}^{n} |\text{percent\_pro}_{i,j}|]{i=0 \qquad\qquad\qquad\qquad\qquad m} \qquad \text{Eq. 8}$$

The impact of the percentage influence profiles is the combined, absolute magnitude of these profiles, as adjusted by the balance factor.

In the current example, the impact of the percentage influence profiles is:

[1100, 0.108, 0.81, 0.4, 1.632]

This converts the percentage influence profiles into an equivalent standard influence profile.

The absolute magnitude of the influence profiles, including the value modifier, which was the total absolute magnitude of the percentage influence profiles, and the base profile is then taken 509 as profile summary:

$$\text{profile\_sum.data}_i = \xrightarrow[|\text{base\_pro}_i| + |\text{value\_mod}| + \sum_{j=0}^{n} |\text{std\_pro}_{i,j}|]{i=0 \qquad\qquad\qquad\qquad\qquad m} \qquad \text{Eq. 9}$$

Here profile summary equals:

profile_sum.data=[2100, 7.708, 5.111, 7.4, 8.532]

The profile summary reflects the accumulated demand levels for the base profile and all of the applicable influence profiles, expressed in the units of the base profile. This allows the error vector as expressed in the delta profile to be allocated to each of its components, namely, the base profile and the various individual influence profiles. For the base profile, this is done by dividing the base profile and the standard influence profiles by the profile summary, resulting in a percent contribution. The percent contribution is then adjusted by the minimum update value. The result is a weighted delta profile for each of the base profile. Where the base value, as a percentage of the profile summary, is less than the minimum update value, then the weighted delta profile value is the minimum update value multiplied by the delta vector. In this case, the value of the base profile is small compared to the profile sum, so the profile is weighted for a minimum amount of change. Otherwise, if the base value, as a percentage of the profile summary is equal to or greater than the minimum update value, then the weighted profile is the percentage change multiplied by the delta vector.

This process is also applied to the influence profiles. The weighted delta profile describes the impact of each profile on the base value profile in predicting, with the forecast profile, the actual demand. The weighted delta profiles are used to update the various profiles to correctly reflect the significance of the difference between the actual demand profile and each of the profiles that contributed to the forecast profile.

Accordingly, the weighted delta profile is then calculated 511 for each of the base profile, and influence profiles (including both the standard and percentage influence profiles). This weighted delta base profile, delta_base may be expressed logically as:

$$\text{delta\_base.data}_i = \xrightarrow[\text{if}\left(\left|\frac{\text{base\_value}_i}{\text{profile\_sum}_i}\right| \geq \text{min\_update}, \left|\frac{\text{base\_value}_i}{\text{profile\_sum}_i}\right| * \text{delta}_i, \text{min\_update} * \text{delta}_i\right)]{i=0 \qquad\qquad\qquad\qquad\qquad\qquad\qquad\qquad m} \qquad \text{Eq. 10}$$

where if(Boolean condition, condition=true, condition=false).

This equation determines how much of the error vector between the actual demand and the forecast demand was attributable to the base profile.

In this example, the Weighted base profile i:

[-42.857, 0.955, 0.285, -0.432, 0.713]

For each of the standard influence profiles, std_proj, a weighted delta profile, delta_std_proj is also determined 511:

$$\text{delta\_std\_proj.data}_i = \xrightarrow[\text{if}\left(\left|\frac{\text{std\_pro}_{j,i}}{\text{profile\_sum}_i}\right| \geq \text{min\_update}, \left|\frac{\text{std\_pro}_{j,i}}{\text{profile\_sum}_i}\right| * \text{delta}_i, \text{min\_update} * \text{delta}_i\right)]{i=0 \qquad\qquad\qquad\qquad\qquad\qquad\qquad\qquad m} \qquad \text{Eq. 11}$$

Accordingly, the weighted standard influence profiles would be:

weighted_rain.data=[-14.286, 0.234, 0.093, -0.108, 0.128]

weighted_monday.data=[-14.286, 0.425, 0.004, -0.216, 0.143]

Again, each standard influence delta profile reflects at least a minimal amount of impact of actual demand on the influence profile. Once the delta profiles for the base, standard, profiles are determined, the underlying profiles themselves can be updated. In order to update each profile, the weighting factor established in each profile, as described above, is applied from the database 127; in the preferred embodiment the weighting factor is 100for the base, standard, and percentage profiles, 40 for the seasonality profiles. Other weighting factors may also be used.

Figure 5B:
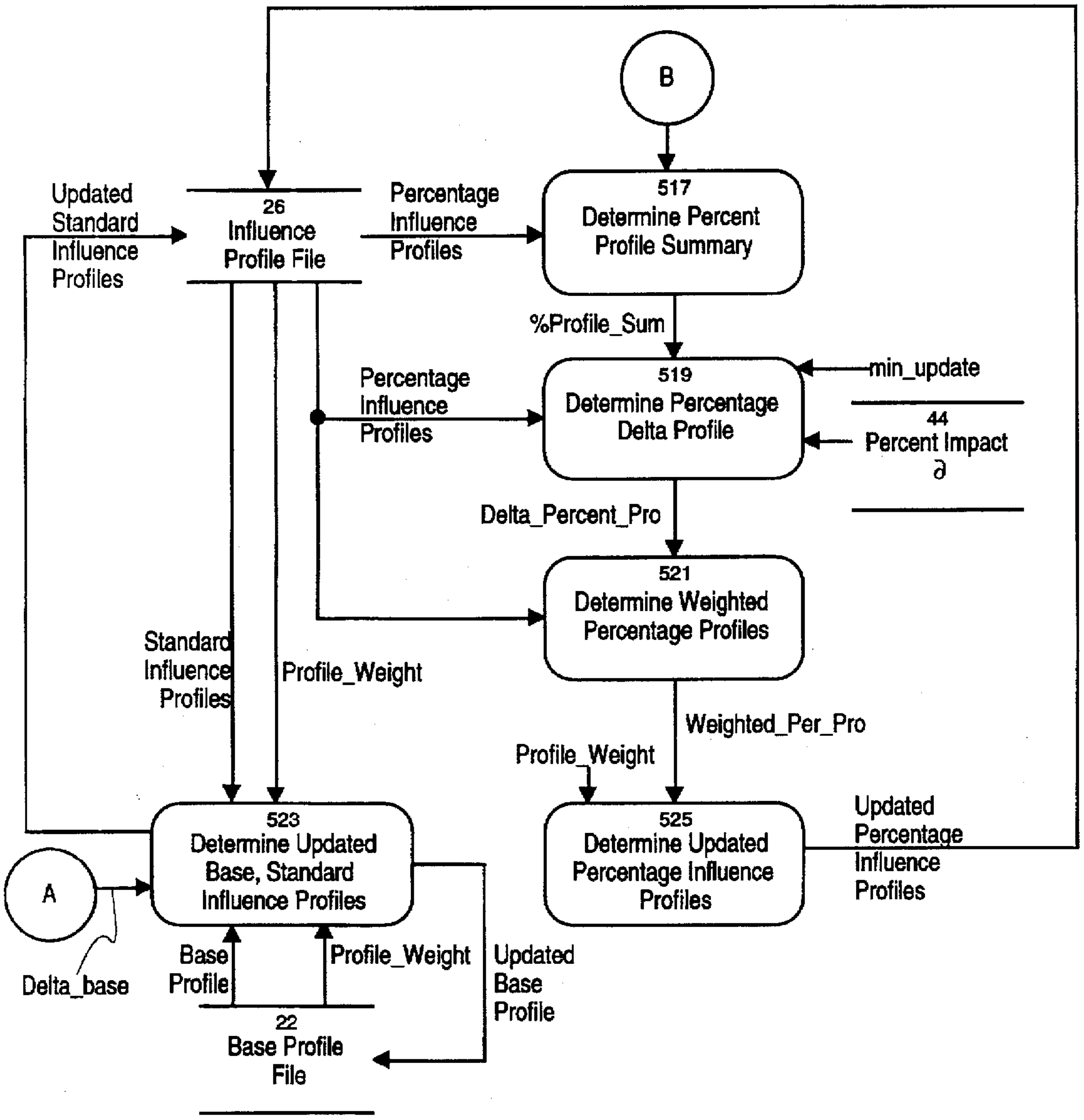

Referring to FIG. 5*b*, for the base profile and the standard influence profiles, the updated profile is determined 523 as:

$$i=0\xrightarrow[\left[profile_i * (1-profile\_weight)+(profile_i+delta\_profile_i) * profile\_weight\right]]{} m \qquad \text{Eq. 12}$$

where "profile" is the original profile, either the base profile or standard influence profile, "profile_weight" is the weighting factor for the profile expressed as a decimal, and "delta_profile" is the delta profile, either delta_base or delta_std_pro, for the original profile being updated.

In order to update the percentage profile, the weighted delta profiles for the percentage influence profiles must also be determined. The use of percentage influence profiles in addition to the standard influence profiles causes two key problems. First, there is the need to determine the relative contribution of the percentage influence profiles to the forecast profile visa vis the stand influence profiles, because standard influence profiles contribute unit values and percentage influence profiles contribute percent changes. Incorrectly dividing up the contribution results in unstable influence profiles and inaccurate subsequent forecasts. A second problems with the percentage influence profiles is that they produce a compounding effect because the unit change to the forecast is based on both the magnitude of the percentage profile itself, and the magnitude of the combined influences and the base profile used to create the forecast profile. Thus there is a variable impact on the business item forecast depending on the volume of demand for the business item. This can make the forecast very unstable, and result in widely varying and inaccurate forecasts. Accordingly, it is desirable to properly determine the relative contribution of the percentage influence profiles and to properly weight each percentage influence profile delta vector. This is done by first determining the portion of the change in forecast due to all of the percentage influence profiles. This is the total percent impact on the base value as shown in Eq 14. The relative impact of each percentage profile on the forecast s profile is then determined with respect to the total impact of the all the percentage profiles on the forecast. This is done as follows.

Referring again to FIG. 5*a*, all the weighted delta profiles are combined 513 to provide a total weighted delta profile:

$$tot\_delta.data_i = i=0\xrightarrow[\sum_{j=0}^{n} delta\_std\_pro_{j,i}+delta\_base_i]{} m \qquad \text{Eq. 13}$$

Here, the total weighted profile is:

[−71.41127, 1.613, 0.382, −0.757, 0.983]

A total percent impact on the base values is determined 515:

$$\delta\ percent.data_i = i=0\xrightarrow[\frac{delta_i - tot\_delta_i * percent\_value_i}{base\_value_i + tot\_delta_i}]{} m \qquad \text{Eq. 14}$$

The δ percent profile describe the overall impact of the percentage profiles on the combined profiles.

Referring to FIG. 5*b*, all of the percentage influence profiles are summed 517 to obtain overall magnitude of the contribution of the percentage influence profiles.

$$\%profile\_sum.data_i = i=0\xrightarrow[\sum_{j=0}^{n} |percent\_pro_{i,j}|]{} m \qquad \text{Eq. 15}$$

Here j iterates over all the percentage profiles, resulting in a single % profile summary with a data value summing over each $i^{th}$ entry in each percentage profile. This is vector combination is different from conventional percentage combination operations because it sums the magnitude of the percentage instead of multiplying them. The absolute value is used in order to obtain the total magnitude of the percent changes.

The weighted percentage influence delta profiles are then determined for each percentage profile, again, using the minimum update values to ensure sufficient impact on the profiles. As before, if the impact of a given percentage influence profile is less then the minimum update value, then the percentage influence delta profile is a function of the minimum update value, otherwise, it is based on the impact of percentage influence profile itself. Each of the percentage influence delta profiles is thusly determined 519:

$$delta\_percent\_proj.data_i = \qquad \text{Eq. 16}$$

$$i=0\xrightarrow[\left(\begin{array}{l} \text{if } \left|\frac{percent\_pro_{i,j}}{\%profile\_sum_{ij}} * \delta percent_{i,j}\right| \geqq min\_update, \\ \left|\frac{percent\_pro_{i,j}}{\%profile\_sum_{ij}}\right| * \delta percent_{i,j}, \\ min\_update * sign(\delta percent_{i,j}) \end{array}\right)]{} m$$

From Eq. 16 there is obtained a factor for each percentage influence profile that indicates how much that percent influence profile must be updated to create a new percent influence profile. Accordingly, from the percentage influence delta profiles, weighted percentage profiles are determined 521, by taking each original percentage influence profile, and adding to it the corresponding delta profile as a normalized value:

$$weighted\_per\_proj.data_i = \qquad \text{Eq. 17}$$

$$i=0\xrightarrow[percent\_pro_{i,j} + delta\_percent\_pro_{i,j} * 100]{} m$$

Here j iterates from the $0^{th}$ to $j^{th}$ percentage profile, so there is a weighted percentage profile corresponding to each percentage profile.

The percentage influence profiles are updated 525 similarly, but the term combining the original profile with the delta profile is replaced with the weighted percentage profiles, since the weighted percentage profiles already reflect the combination of the original percentage influence profiles and the delta percentage influence profiles:

$$i = 0 \xrightarrow[\text{[percent-pro}_i * (1 - \text{profile\_weight}) + \text{weighted\_per\_pro}_i * \text{profile\_weight]}]{} m \quad \text{Eq. 18}$$

This update process 209 is preferably applied at the end of all time intervals specified in the base profile. Thus, for base profiles that track demand over a single day, the base profile and its influence profiles are updated after each day to which the base profile applies. If the base profile extends over a shorter or longer period, it is updated accordingly. For seasonality influence profiles that extend over many days, the profile is updated after all dates to which the influence profile applies have passed. The delta profile for the seasonality influence profile is determined for each dates in the date range, and these delta profiles are averaged. The exponential update formula above is then applied, using the average delta profiles instead of the weighted percentage influence profiles.

The next time demand for the item tracked by the base profile is forecasted 203, the forecast is made with the updated profiles, and will more closely track the last set of actual demand data that was received. Continuing the foregoing example, the first forecast profile was:

forecast.1.data=[1350, 1.01, 0.95, 0.96, 0.84].

And actual demand recorded in database 127 was:

actual.data=[1200, 115, 3, 4, 4.5]

After updating the base, standard, and percentage influence profiles, the next forecast will be:

forecast.2.data=[1200, 7.224, 3.007, 3.958, 4.5]

As can be seen, this second forecast more closely reflects the last actual demand that was recorded. Subsequent production 205 of the forecasted business item is then performed as above.

As mentioned above, the data values for the influence profiles may be initially specified with null values. A business manager may choose to do this in order to determine what impact, if any, a particular influence has the demand for one or more business items. In this case, the update profiles 307 process will update the base profile using 100% of the forecast profile, and will then update the influence profile, and hence provide initial data values, by an appropriate amount, as determined by the foregoing process. This will cause the influence profile to reflect the actual influence on business demand that it has on the business item, allowing the business manager to determine the impact of the influence, as desired. This analytical technique can be used to determine the impact, or influence, of particular staff or management employees, of particular advertising programs or formats, of particular promotional events, such as sales or discounts, and so on. Those of skill in the art, and those in particular businesses, can identify numerous other factors which may be analyzed in conformity with the inventive process.

APPENDIX A

© 1995 Park City Group, Inc.

```
file:    base_profile
         description:    "Base Profiles"
         version:        1.0
 #       definition:     "Contains information and data for the
                         historical average profile of an item."
 #       entity type:    ENTITY
 #       team owners:    sales
 #       database:       SLS

#--Fields
#-----------------------------------------------------------------------
field:   Location
         description:    "Location number"
         type:           long
 #       definition:     "Identifies a specific location within the
                         company."
 #       format:
 #       field type:     FOREIGN KEY TO LOCATION.INI

field:   Dept
         description:    "Department Number"
         type:           short
 #       definition:     "Identifies a specific department within the
                         company."
 #       format:
 #       field type:     FOREIGN KEY TO DPTMST

field:   LocalId
         description:    "Local Profile Identifier"
         type:           long
 #       definition:     "Identifies a specific profile within a
                         department on
 #                       the PC."
 #       format:
 #       field type:     PRIMARY KEY

field:   HostId
         description:    "Host Profile Identifier"
         type:           long
 #       definition:     "Uniquely identifies the same specific profile
                         on the
 #                       host."
 #       format:
 #       field type:     PRIMARY KEY ON HOST

field:   Category
         description:    "Type of item being tracked"
         type:           unsigned short
 #       definition:     "Specifies the type of item that will be
         tracked."
 #       format:
 #       field type:     REFERENCE
```

```
field:  ItemId
        description:    "Id of item being tracked"
        type:           string[15]
#       definition:     "Identifies a specific item/group that is
        associated/tracked with this profile. Must be unique within
        category. Cannot be empty."
#       format:
#       field type:     ALTERNATE KEY

field:  Description
        description:    "Description or name"
        type:           string[30]
#       definition:     "Specifies the fully spelled name or short
#                        description of the profile."
#       format:
#       field type:           ATTRIBUTE

field:  Weight
        description:    "Weighting used to update"
        type:           short
#       definition:     "Specifies the weighting factor used to update
        the
#                        profile."
#       format:
#       field type:     ATTRIBUTE

field:  UpdateDate
        description:    "Last date curve was updated"
        type:           date
#       definition:     "Specifies the last date that the profile was
        updated."
#       format:
#       field type:     ATTRIBUTE

field:  StartTime
        description:    "Time of first period"
        type:           long
#       definition:     "Specifies the start of the first period in
        seconds
#                        from midnight."
#       format:
#       field type      ATTRIBUTE

field:  PeriodFlag
        description:    "Defines type of period stored"
        type:           unsigned short
#       definition:     "Specifies the type of time period and profile
        that is
#                        stored. Valid values are:
#                        0 - Default Period (map to open times).
#                            Variable length profile.
#                        1 - Day (apply value to open times). One day
        (period)
#                            in profile.
#                        7 - Same as 0, except with fixed length
        profile."
#       format:
#       field type:     REFERENCE
```

```
field:  Units
        description:    "Units for stored data"
        type:           unsigned short
#       definition:     "Specifies the units of measurement for the
        stored
#                        data. Values are:
#                        1 - Each
#                        2 - Base Mass Unit
#                        3 - Base Volume Unit
#                        4 - Base Money Unit
#       format:
#       field type:     REFERENCE

field:  PeriodLength
        description:    "Length of period in seconds"
        type:           unsigned long
#       definition:     "Specifies the length of the periods, in
        seconds."
#       format:
#       field type:     ATTRIBUTE

field:  HostFlag
        description:    "Downloaded Flag"
        type:           short
#       definition:     "When set, specifies that the record was
        downloaded
#                        from the Host and has not yet been merged into
        the
#                        working PC records."
#       format:
#       field type:     REFERENCE

field:  Data
        description:    "Data as variable length array"
        type:           varlen double[512]
#       definition:     "Contains the data for the profile."
#       format:
#       field type:     ATTRIBUTE

#--Keys
#---------------------------------------------------------------------
key:    LocationLocalId
        description:    "Location, Dept, LocalId, HostId, HostFlag"
        fields:         Location, Dept, LocalId, HostId, HostFlag
        options:        unique
#       key type:       PRIMARY

key:    LocalIdLocation
        description:    "LocalId, Location, Dept, HostId, HostFlag"
        fields:         LocalId, Location, Dept, HostId, HostFlag
        options:        unique
#       key type:       ALTERNATE

key:    LocationItemId
        description:    "Location, Dept, Item, HostFlag"
        fields:         Location, Dept, Category, ItemId, HostFlag
        options:        unique
```

```
#       key type:       ALTERNATE

key:    ItemIdLocation
        description:    "Category, ItemId, Location, Dept, HostFlag"
        fields:         Category, ItemId, Location, Dept, HostFlag
        options:        unique
#       key type:       SECONDARY

key:    HostFlagKey
        description:    "HostFlag Key"
        fields:         HostFlag
        options:        duplicate
#       key type:       SECONDARY

key:    HostIdKey
        description:    "HostId, Location, Dept"
        fields:         HostId, Location, Dept
        options:        duplicate
#       key type:       SECONDARY
```

```
file:   influence_profile
            description:    "Profile Modifiers"
            version:        1.0
#       definition:     "Contains the modifiers used to adjust
        forecasts."
#       entity type:    ENTITY
#       team owners:    Sales
#       database:       SLS

#--Fields
#------------------------------------------------------------------------
field:  Location
            description:    "Location number"
            type:           long
#       definition:     "Identifies a specific location within the
        company."
#       format:
#       field type:     FOREIGN KEY TO LOCATION.INI

field:  Dept
            description:    "Department Number"
            type:           short
#       definition:     "Identifies a specific department within the
        company."
#       format:
#       field type:     FOREIGN KEY TO DPTMST

field:  LocalId
            description:    "Id Number for profile"
            type:           long
#       definition:     "Identifies a specific profile within a
            department on
#                           the PC."
#       format:
#       field type:     PRIMARY KEY

field:  HostId
            description:    "Id Number used on Host"
            type:           long
#       definition:     "Uniquely identifies the same specific profile
                         on the host."
#       format:
#       field type:     PRIMARY KEY ON HOST

field:  BaseProfileId
            description:    "Base to be modified"
            type:           long
#       definition:         "Specifies the local identifier for the
                               base profile that is to be modified."
#       format:
#       field type:         FOREIGN KEY TO SLSBASE

field:  HostBaseProfileId
            description:    "Id Number for base on Host"
            type:           long
```

```
#       definition:           "Specifies the Host identifier for the
                                base profile that is to be modified."
#       format:
#       field type:           FOREIGN KEY TO SLSBASE

field:  ModifierGroup
            description:    "Modifier group this belongs to"
            type:           unsigned short
#       definition:           "Identifies the modifier group that this
                                modifier belongs to."
#       format:
#       field type:           FOREIGN KEY TO SLSMODG

field:  HostModifierGroup
            description:    "Id Number for Modifier group on Host"
            type:           unsigned short
#       definition:           "Identifies the modifier group, on the
                                    host, that this modifier belongs
        to."
#       format:
#       field type:           FOREIGN KEY TO SLSMODG

field:  Weight
            description:    "Weighting used to update"
            type:           unsigned short
#       definition:     "Specifies the weighting factor used to update
                              the profile."
#       format:
#       field type:     ATTRIBUTE

field:  UpdateDate
            description:    "Last date curve was updated"
            type:           date
#       definition:     "Specifies the last date that the profile was
                              updated."
#       format:
#       field type:     ATTRIBUTE

field:  StartTime
            description:    "Time of first period"
            type:           long
#       definition:     "Specifies the start of the first period in
                              seconds from midnight."
#       format:
#       field type      ATTRIBUTE

field:  PeriodFlag
            description:    "Defines type of period stored"
            type:           unsigned short
#       definition:     "Specifies the type of time period and profile
                         that is
#                        stored. Valid values are:
#                        0 - Default Period (map to open times).
#                            Variable length profile.
#                        1 - Day (apply value to open times). One day
        (period)
#                            in profile.
```

```
#                       7 - Same as 0, except with fixed length
        profile."
#       format:
#       field type:     REFERENCE

field:  Units
            description:    "Units for stored data"
            type:           unsigned short
#       definition:     "Specifies the units of measurement for the
                         stored
#                        data. Values are:
#                        0 - Percent
#                        1 - Each
#                        2 - Base Mass Unit
#                        3 - Base Volume Unit
#                        4 - Base Money Unit
#       format:
#       field type:     REFERENCE

field:  HostFlag
            description:    "Host Download Flag"
            type:           short
#       definition:     "When set, specifies that the record was
                         downloaded
#                        from the Host and has not yet been merged into
                         the
#                        working PC records."
#       format:
#       field type:     REFERENCE

field:  Data
            description:    "Data as variable length array"
            type:           varlen double[512]
#       definition:     "Contains the data for the profile."
#       format:
#       field type:     ATTRIBUTE

#--Keys
#----------------------------------------------------------------------
key:    LocationLocalId
            description:    "Location, Dept, LocalId, HostId, HostFlag"
            fields:         Location, Dept, LocalId, HostId, HostFlag
            options:        unique
#       key type:       PRIMARY

key:    LocalIdLocation
            description:    "LocalId, Location, Dept, HostId, HostFlag"
            fields:         LocalId, Location, Dept, HostId, HostFlag
            options:        unique
#       key type:       ALTERNATE

key:    LocationBaseIdModGroup
            description:    "Location, Dept, BaseProfileId,
        ModifierGroup, HostBaseProfileId, HostFlag"
            fields:         Location, Dept, BaseProfileId,
        ModifierGroup, HostBaseProfileId, HostFlag
            options:        unique
#       key type:       ALTERNATE
```

```
key:    BaseIdModGroupLocation
            description:    "BaseProfileId, ModifierGroup, Location,
        Dept, HostBaseProfileId, HostFlag"
            fields:         BaseProfileId, ModifierGroup, Location,
        Dept, HostBaseProfileId, HostFlag
            options:        unique
#       key type:       ALTERNATE

key:    HostFlagKey
            description:    "HostFlag"
            fields:         HostFlag
            options:        duplicate
#       key type:       SECONDARY

key:    BaseIdLocation
            description:    "BaseProfileId, Location, Dept"
            fields:         BaseProfileId, Location, Dept
            options:        duplicate
#       key type:       SECONDARY

key:    ModifierGroupLocation
            description:    "ModifierGroup, Location, Dept"
            fields:         ModifierGroup, Location, Dept
            options:        duplicate
#       key type:       SECONDARY

key:    LocationModifierGroup
            description:    "Location, Dept, ModifierGroup"
            fields:         Location, Dept, ModifierGroup
            options:        duplicate
#       key type:       SECONDARY
```

```
file:   forecast_profile
description:      "Forcasted Profiles"
        version:  1.0
#       definition:     "Contain the sales forcasted profiles.  Note:
        Other information not listed in this table is retreived from
        the Base Profile.  i.e., description, category, etc..."
#       entity type:    ENTITY
#       team owners:    Sales
#       database: SLS


# - Fields
# -------------------------------------------------------------

field:   Location
        description:    "Location number"
        type:               long
#       definition:     "Identifies a specific location within the
        company."
#       format:
#       field type:     FOREIGN KEY TO LOCATION.INI


field:   Dept
        description:    "Department Number"
        type:               short
#       definition:     "Identifies a specific department within a
        location within the company."
#       format:
#       field type:     FOREIGN KEY TO DPTMST


field:   LocalId
        description:    "Id number for Base Profile on PC"
        type:           long
#       definition:     "Identifies a specific base profile within a
        department located on a PC."
#       format:
#       field type:     FOREIGN KEY TO SLSMODG


field:   HostId
        description:    "Id number for Base Profile on Host"
        type:               long
#       definition:     "Uniquely identifies the same specific base
        profile on the host."
#       format:
#       field type:     PRIMARY KEY ON HOST


field:  ProjectedDate
        description:    "Date projection is for"
        type:           date
#       definition:     "Specifies the sales date when the projection is
        to forcast to."
#       format:
```

```
#       field type:     ATTRIBUTE

field:  UpdateTime
        description:    "Time last modified"
        type:           time
#       definition:     "Specifies the time when the last modification
        to the profile took place.  Can be used to track the change to
        the curve over time."
#       format:
#       field type:     ATTRIBUTE

field:  UpdateStatus
        description:    "Status of projection"
        type:           short
#       definition:     "Specifies the current status of the projection.
        Valid values are: 0 - Business day defined and all profiles
        found, 1 - Business day not defined, default used, 2 - No
        default, only base profile used."
#       format:
#       field type:     REFERENCE

field:  ModList
        description:    "List of modifiers used"
        type:           long[30]
#       definition:     "Contain a list of modifiers used to modify the
        base profile.  Valid values are user defined."
#       format:
#       field type:     FOREIGN KEY TO SLSMODIF

field:  StartTime
        description:    "Time of first period"
        type:           long
#       definition:     "Specifies the time, in seconds, for the profile
        from the beginning of the sale date."
#       format:
#       field type:     ATTRIBUTE

field:  PeriodFlag
        description:    "Defines type of period stored"
        type:           unsigned short
#       definition:     "Specifies the type of period stored for the
        profile.  Valid values are: 0 - Default periods (map to open
        times, 1 - Day (apply total for sales day to open times. Period
        Length does not apply, set to 0. If DataLen > 1, then each
        entry in Data is for a consecutive sate date.), 2 - Week (apply
        total for week to open times in week. Period length does not
        apply, set to 0.), 3 - Month (apply total to sales month.
        Period length does not apply, set to 0.), 4 - Year (apply total
        to sales year. Period length does not apply, set to 0.), 5 -
        Same as 0 except StartTime is relative to open time., 6 - Same
        as 0 except StartTime is relative to close time."
#       format:
#       field type:     REFERENCE
```

```
field:  Units
        description:    "Units for stored data"
        type:                   unsigned short
#       definition:     "Specifies the units of measurement used to
        store the data.  Valid values are: 0 - N/A (Percent), 1 - Each,
        2 - Base Mass Unit, 3 - Base Volume Unit, 4 - Base Money Unit,
        5 through 9 are reserved."
#       format:
#       field type:     REFERENCE


field:  PeriodLength
        description:    "Length of period in seconds"
        type:                   unsigned long
#       definition:     "Specifies the amount of time taken for each
        period, in seconds, in the profile."
#       format:
#       field type:     ATTRIBUTE


field:  Data
        description:    "Data as variable length array"
        type:                   varlen double[512]
#       definition:     "Contains the data for the profile in a variable
        length array."
#       format:
#       field type:     ATTRIBUTE


# -- Keys
# ----------------------------------------------------------------

key:    LocationLocalIdProjDate
        description:    "Location, Dept, LocalId, ProjectedDate,
        UpdateTime, HostId"
        fields:         Location, Dept, LocalId, ProjectedDate,
        UpdateTime, HostId
        options:  unique
#       key type:       PRIMARY


key:    LocalIdLocationProjDate
        description:    "LocalId, Location, Dept, ProjectedDate,
        UpdateTime, HostId"
        fields:         LocalId, Location, Dept, ProjectedDate,
        UpdateTime, HostId
        options:  unique
#       key type:       ALTERNATE


key:    ProjDateLocalIdLocation
        description:    "ProjectedDate, LocalId, Location, Dept,
        UpdateTime, HostId"
        fields:         ProjectedDate, LocalId, Location, Dept,
        UpdateTime, HostId
        options:  unique
```

```
#       key type: ALTERNATE

key:    LocationProjDateLocalId
        description:    "Location, Dept, ProjectedDate, LocalId"
        fields:         Location, Dept, ProjectedDate, LocalId
        options:  duplicate
#       key type: SECONDARY
```

```
file:   influence_group
            description:    "Modifier group definition file."
            version:        1.0
#       definition:     "Defines a modifier group(buisness influence)."
#       entity type:    ENTITY
#       team owners:    Sales
#       database:       SLS

# -- Fields
# ----------------------------------------------------------------
field:  Location
            description:    "Location number"
            type:           long
#       definition:     "Identifies a specific location within the
        company."
#       format:
#       field type:     FOREIGN KEY TO LOCATION.INI

field:  Dept
            description:    "Department Number"
            type:           short
#       definition:     "Identifies a specific department within the
        company."
#       format:
#       field type:     FOREIGN KEY TO DPTMST

field:  LocalId
            description:    "Modifier Group Id used on PC"
            type:           unsigned short
#       definition:     "Identifies a specific group within a department
        on
#                        the PC."
#       format:
#       field type:     PRIMARY KEY

field:  HostId
            description:    "Modifier Group Id used on Host"
            type:           unsigned short
#       definition:     "Uniquely identifies the same specific group on
        the
#                        host."
#       format:
#       field type:     PRIMARY KEY ON HOST

field:  Description
            description:    "Description"
            type:           string[30]
#       definition:     "Specifies the fully spelled name or short
        description of the group."
#       format:
#       field type:     ATTRIBUTE

field:  Acronym
            description:    "Keyed short name"
            type:           string[15]
#       definition:     "Primary Alpha key into record."
```

```
#       format:
#       field type:     REFERENCE

field:  DefaultWeight
            description:    "Weighting defaulted into modifier"
            type:           unsigned short
#       definition:     "Specifies value defaulted into a modifier at
        creation."
#       format:
#       field type:     ATTRIBUTE

field:  DefaultPeriodType
            description:    "PeriodType defaulted into modifier"
            type:           unsigned short
#       definition:     "Specifies the period type that is the starting
        point for the creation of the modifier. Valid values are 0,1,7"
#       format:
#       field type:     REFERENCE

field:  DefaultModType
            description:    "Flag for type of modifier"
            type:           unsigned short
#       definition:     "Specifies the modifier type that is created.
        Valid values are 0 - Type is the same as the base profile only
        percentage modifier, 1 - The type is the same as the base
        profile."
#       format:
#       field type:     REFERENCE

field:  DefaultPercent
            description:    "NOT USED"
            type:           short
#       definition:
#       format:
#       field type:

field:  HostFlag
            description:    "Host Download Flag"
            type:           short
#       definition:     "When set, specifies that the record was
        downloaded from the Host and has not yet been merged into the
        working PC records."
#       format:
#       field type:     REFERENCE

#--Keys
#---------------------------------------------------------------------
key:    LocationDeptLocalId
            description:    "Location, Dept, LocalId, HostId, HostFlag"
            fields:         Location, Dept, LocalId, HostId, HostFlag
            options:        unique
#       key type:       PRIMARY

key:    LocalIdLocationDept
            description:    "LocalId, Location, Dept, HostId, HostFlag"
            fields:         LocalId, Location, Dept, HostId, HostFlag
            options:        unique
#       key type:       ALTERNATE
```

```
key:    LocationDeptAcro
            description:    "Location, Dept, Acronym, HostFlag"
            fields:         Location, Dept, Acronym, HostFlag
            options:        unique
#       key type:       ALTERNATE

key:    AcroLocationDept
            description:    "Acronym, Location, Dept, HostFlag"
            fields:         Acronym, Location, Dept, HostFlag
            options:        unique
#       key type:       ALTERNATE

key:    HostFlagKey
            description:    "HostFlag"
            fields:         HostFlag
            options:        duplicate
#       key type:       SECONDARY

key:    HostIdLocationDept
            description:    "HostId, Location, Dept"
            fields:         HostId, Location, Dept
            options:        duplicate
#       key type:       SECONDARY
```

```
file:   sales_definition
        description:    "Sales Definition File"
        version:  3.0
#       definition:     "Contains the definitions of any additional user
        defined items that the end user wants to track and/or forecast
        against."
#       entity type:    ENTITY
#       team owners:    Sales Team
#       database: SLS


# - Fields
# ----------------------------------------------------------------

field:   Location
        description:    "Location number"
        type:           long
#       definition:     "Identifies a specific location."
#       format:
#       field type:     FOREIGN KEY TO SLSBASE

field:   Dept
        description:    "Department Number"
        type:           short
#       definition:     "Identifies a specific department within the
        company."
#       format:
#       field type:     FOREIGN KEY TO SLSBASE

field:  Category
        description:    "Type of item being tracked"
        type:           unsigned short
#       definition:     "Specifies the type or category  of the item
        being tracked."
#       format:
#       field type:     FOREIGN KEY TO SLSBASE

field:  ItemId
        description:    "Id of item being tracked"
        type:           string[15]
#       definition:     "Identifies the item being tracked."
#       format:
#       field type:     FOREIGN KEY TO SLSBASE

field:  Desc
        description:    "Description of item"
        type:           string[30]
#       definition:     "Describes the item being tracked."
#       format:
#       field type:     ATTRIBUTE

field:  Options
        description:    "Options"
        type:           unsigned short
```

```
#       definition:     "Specifies the processing options for the item
        being tracked.  Valid values are: 1 = Has Profile, 2 = Transmit
        when changed, 4 - Allow user overrides, 8 - Report."
#       format:
#       field type:     REFERENCE

field:  XmitFlag
        description:    "Designates files to be transmitted"
        type:           unsigned short
#       definition:     "Specifies the type of projection for the item
        being tracked and the oder of use for these types.  Valid
        values are: 1 - Slsname, 2 - Slsndat, 4 - Slsfor, 8 - Slsbase,
        16 - Slsmodif"
#       format:
#       field type:     ATTRIBUTE

field:  ProjectionTypes
        description:    "Projection Type Order Of Use"
        type:           string[10]
#       definition:     "Specifies the type of projection for the item
        being tracked and the oder of use for these types.  Valid
        values are: Manager Override Value, Location Forecast Value,
        Corporate Forecast Value, Financial Override Value, Last Year
        Actual Value."
#       format:
#       field type:     ATTRIBUTE


# - Keys
# -------------------------------------------------------------

key:    Key1Name
        description:    "Key used to identify slsname items "
        fields:         Location, Dept, Category, ItemId
        options: unique
#       key type: PRIMARY

key:    Key2Name
        description:    "Key used to identify slsname items"
        fields:         Category, ItemId, Location, Dept
        options: unique
#       key type: ALTERNATE
```

```
file:    sales_data
         description:    "Sales Data file"
         version:        3.0
#        definition:     "Contains data for the storage of daily values
         of an item."
#        entity type:    ENTITY
#        team owners:    sales
#        database:       SLS


# - Fields
# ------------------------------------------------------------

field:   Location
         description:    "Location within organization tree"
         type:           long
#        definition:     "Identifies a specific location within the
         company."
#        format:
#        field type:     FOREIGN KEY TO LOCATION.INI

field:   Dept
         description:    "Department within organization tree"
         type:           short
#        definition:     "Identifies a specific department within the
         company."
#        format:
#        field type:     FOREIGN KEY TO DPTMST

field:   Category
         description:    "Kind of ItemId used"
         type:           unsigned short
#        definition:     "Specifies the type of item that will be
         tracked."
#        format:
#        field type:     REFERENCE

field:   ItemId
         description:    "Item identification"
         type:           string[15]
#        definition:     "Identifies a specific item/group that is
         associated/tracked with this profile. Must be unique within
         category. Cannot be empty."
#        format:
#        field type:     ALTERNATE KEY

field:   SalesDate
         description:    "Sales Date"
         type:           date
#        definition:     "Specifies the date for which this data
         applies."
#        format:
#        field type:     ATTRIBUTE

field:   ActualFlag
         description:    "Non-zero indicates Actual field has data"
```

```
        type:           short
#       definition:     "Specifies if Actual contains valid data."
#       format:
#       field type:     REFERENCE

field:  Actual
        description:    "Actual amount of Data"
        type:           double
#       definition:     "Specifies the total of the slstim data for this
        item for sales date."
#       format:
#       field type:     ATTRIBUTE

field:  ModifiedFlag
        description:    "Non-zero indicates Modified field has data"
        type:           short
#       definition:     "Specifies if Modified contains valid data."
#       format:
#       field type:     REFERENCE

field:  Modified
        description:    "Modified amount of Data"
        type:           double
#       definition:     "For future use."
#       format:
#       field type:     ATTRIBUTE

field:  FinancialFlag
        description:    "Non-zero indicates Financial field has data"
        type:           short
#       definition:     "Specifies if Financial contains valid data."
#       format:
#       field type:     REFERENCE

field:  Financial
        description:    "Financial amount of Data"
        type:           double
#       definition:     "Specifies a downloaded Financial amount."
#       format:
#       field type:     ATTRIBUTE

field:  OverrideFlag
        description:    "Non-zero indicates Override field has data"
        type:           short
#       definition:     "Specifies if Override contains valid data."
#       format:
#       field type:     REFERENCE

field:  Override
        description:    "Overrided amount of Data"
        type:           double
#       definition:     "Specifies the manual override amount."
#       format:
#       field type:     ATTRIBUTE

field:  HostFlag
        description:    "Non-zero indicates HostProjected field has
        data"
```

```
        type:           short
#       definition:     "Specifies if HostFlag contains valid data."
#       format:
#       field type:     REFERENCE

field:  HostProjected
        description:    "Host Projected amount of Data"
        type:           double
#       definition:     "Specifies the downloaded Host Projected
        amount."
#       format:
#       field type:     ATTRIBUTE

field:  BdmFlag
        description:    "Non-zero indicates BdmProjected field has
        data"
        type:           short
#       definition:     "Specifies if DbmProjected contains valid data.
#       format:
#       field type:     REFERENCE

field:  BdmProjected
        description:    "BDM Projected amount of Data"
        type:           double
#       definition:     "Specifies the BDM projected amount."
#       format:
#       field type:     ATTRIBUTE

field:  SlsForecastFlag
        description:    "Non-zero indicates SlsForecastFlag field has
        data"
        type:           short
#       definition:     "Specifies if SlsForecastProjected contains
        valid data.
#       format:
#       field type:     REFERENCE

field:  SlsForecastProjected
        description:    "Sales Forecasted Projected amount of Data"
        type:           double
#       definition:     "Specifies the slsForecast projected amount."
#       format:
#       field type:     ATTRIBUTE

field:  LastYrActualFlag
        description:    "Non-zero indicates LastYrActual field has
        data"
        type:           short
#       definition:     "Specifies if LastYrActual contains valid data.
#       format:
#       field type:     REFERENCE

field:  LastYrActual
        description:    "Last Year Actual amount of Data"
        type:           double
#       definition:     "Specifies the actual for last year on sales
        date."
#       format:
```

```
#       field type:     ATTRIBUTE

#--Keys
#---------------------------------------------------------------------
key:    LocationDateItemIdData
        description:   "Location, Dept, SalesDate, Category, ItemId"
        fields:         Location, Dept, SalesDate, Category, ItemId
        options:        unique
#       key type:       PRIMARY

key:    LocationItemIdDate
        description:   "Location, Dept, Category, ItemId, SalesDate"
        fields:         Location, Dept, Category, ItemId, SalesDate
        options:        unique
#       key type:       ALTERNATE

key:    DateItemIdLocation
        description:   "SalesDate, Category, ItemId, Location, Dept"
        fields:         SalesDate, Category, ItemId, Location, Dept
        options:        unique
#       key type:       ALTERNATE

key:    ItemIdDateLocation
        description:   "Category, ItemId, SalesDate, Location, Dept"
        fields:         Category, ItemId, SalesDate, Location, Dept
        options:        unique
#       key type:       ALTERNATE
```

```
file:   actual_demand
    description:    "Actual Demand Profiles"
    version: 1.0
#   definition:     Profile of actual counts for time
#   entity type:    ENTITY
#   team owners:    Sales
#   database:       SLS

# -- Fields
# -------------------------------------------------------------------
field:   Location
    description:    "Location number"
    type:           long
#   definition:     "Identifies a specific location within the company."
#   format:
#   field type:     FOREIGN KEY TO SLSBASE AND/OR SLSNAME

field:   Dept
    description:    "Department Number"
    type:           short
#   definition:     "Identifies a specifiec department within the
        company."
#   format:
#   field type:     FOREIGN KEY TO SLSBASE AND/OR SLSNAME

field:  SalesDate
    description:    "Sales date"
    type:           date
#   definition:     "Specifies the date for which the data applies."
#   format:
#   field type:     ATTRIBUTE


field:  UpdateFlag
    description:    "Status of use for updates"
    type:           unsigned short
#   definition:     "Indicates whether modifications have been done or
        not."
#   format:
#   field type:     REFERENCE

field:  Category
    description:    "Type of item being tracked"
    type:           unsigned short
#   definition:     "Specifieds the type of Item being tracked."
#   format:
#   field type:     REFERENCE

field:  ItemId
    description:    "Id of item being tracked"
    type:           string[15]
#   definition:     "Identifies a specific item/group that is tracked."
#   format:
#   field type:     FOREIGN KEY TO SLSBASE AND/OR SLSNAME

field:   StartTime
```

```
        description:    "Time of first period"
        type:           long
 #      definition:     "Specifies the start of the first time period, in
           seconds from midnight, for data."
 #      format:
 #      field type:     ATTRIBUTE

field:          PeriodLength
        description:    "Length of period in seconds"
        type:           unsigned long
 #      definition:     "Specifies the length of the time periods, in
           seconds, for data."
 #      format:
 #      field type:     ATTRIBUTE

field:          Units
        description:    "Units for stored data"
        type:           unsigned short
 #      definition:     "Specifies the units of measurement for data."
 #      format:
 #      field type:     ATTRIBUTE

field:          Data
        description:    "Data as variable length array"
        type:           varlen double[512]
 #      definition:     "Contains the data for the profile curve."
 #      format:
 #      field type:     ATTRIBUTE

 # -- Keys
 # ----------------------------------------------------------------
key:            LocationDateItem
        description:    "Location, Dept, SalesDate, Category, ItemId"
        fields:         Location, Dept, SalesDate, Category, ItemId
        options:        unique
 #      key type:       PRIMARY

key:            DateItemLocation
        description:    "SalesDate, Category, ItemId, Location, Dept"
        fields:         SalesDate, Category, ItemId, Location, Dept
        options:        unique
 #      key type:       ALTERNATE

key:            ItemLocationDate
        description:    "Category, ItemId, Location, Dept, SalesDate"
        fields:         Category, ItemId, Location, Dept, SalesDate
        options:        unique
 #      key type:       ALTERNATE

key:            UpdateFlagDate
        description:    "UpdateFlag, SalesDate"
        fields:         UpdateFlag, SalesDate
        options:        duplicate
 #      key type:       ALTERNATE
```

```
file:   business_day_model
        description:  "Business Day Model"
        version:      1.0
#       definition:   This defines the characteristics of a Buisness Day
#       entity type:  ENTITY
#       team owners:  Sales
#       database:     SLS

# -- Fields
# ----------------------------------------------------------

field:  Location
        description:  "Location number"
        type:         long
#       definition:   "Identifies a specific location within the
        company."
#       format:
#       field type:   FOREIGN KEY TO LOCATION.INI

field:  Dept
        description:  "Department Number"
        type:         short
#       definition:   "Specifies the date when the model was created."
#       format:
#       field type:   FOREIGN KEY TO DPTMST

field:  SalesDate
        description:  "Sales Date"
        type:         date
#       definition:   "Specifies the date for which the model applies."
#       format:
#       field type:   ATTRIBUTE

field:  UpdateFlag
        description:  "Status of update"
        type:         unsigned short
#       definition:   "Indicates the update status of the profiles."
#       format:
#       field type:   REFERENCE

field:  OpenTime
        description:  "Time of first period"
        type:         long
#       definition:   "Specifies the time, when sales are first allowed,
        in seconds from midnight of the sales date."
#       format:
#       field type:   ATTRIBUTE

field:  CloseTime
        description:  "Time of end of last period"
        type:         long
#       definition:   "Specifies the time, when sales are last allowed,
        in seconds from midnight of the sales date."
#       format:
#       field type:   ATTRIBUTE

field:  Comments
```

```
        description:  "Comments"
        type:         string[80]
#       definition:   "Contains comments from the user about the day."
#       format:
#       field type:   ATTRIBUTE

field:  ModGroupList
        description:  "List of Modifier Groups used"
        type:         varlen unsigned short[60]
#       definition:   "Contains a list of Influences specified.
        Identifiers are paired Host and local identifiers."
#       format:
#       field type:   FOREIGN KEY TO SLSMODG

# -- Keys
# ----------------------------------------------------------

key:    LocationDeptDate
        description:  "Location, Dept, SalesDate"
        fields:       Location, Dept, SalesDate
        options:      unique
#       key type:     PRIMARY

key:    DateLocationDept
        description:  "SalesDate, Location, Dept"
        fields:       SalesDate, Location, Dept
        options:      unique
#       key type:     ALTERNATE

key:    UpdateFlagDateLocation
        description:  "UpdateFlag, SalesDate, Location, Dept"
        fields:       UpdateFlag, SalesDate, Location, Dept
        options:      duplicate
#       key type:     SECONDARY
```

```
file:   sales_lookup
        description:    "Sales Lookup Table File"
        version:  2.1
#       definition:     "Contains the lookup cross reference information
        for the sales table."
#       entity type:    ENTITY
#       team owners:    Sales
#       database: SLS


# -- Fields
# ---------------------------------------------------------------------

field:  TableKey
        description:    "Table Key"
        type:           string[8]
#       definition:     "Identifies the table for the lookup."
#       format:
#       field type:     PRIMARY KEY


field:  Send
        description:    "Send Data"
        type:           string[20]
#       definition:     "Contains the data that will be sent."
#       format:
#       field type:     ATTRIBUTE


field:  SendType
        description:    "Send Type"
        type:           unsigned int
#       definition:     "Specifies the type data to be sent.  Valid
        values are: 6 - double, 9 - long, 11 - date, 12 - time, 13 -
        boolean, 14 - string.  All valid values are stored in
        FSGTYPE.H."
#       format:
#       field type:     REFERENCE


field:  ReturnType
        description:    "Return Type"
        type:           unsigned int
#       definition:     "Specifies the type data to be received.  Valid
        values are:  6 - double, 9 - long, 11 - date, 12 - time, 13 -
        boolean, 14 - string.  All valid values are stored in
        FSGTYPE.H."
#       format:
#       field type:     REFERENCE


field:  Return
        description:    "Return Data"
        type:           varlen string[80]
#       definition:     "Contains the data that was received."
#       format:
```

```
#       field type:     ATTRIBUTE

# -- Keys
# ---------------------------------------------------------------------

key:    Key1Tbl
        description:    "Key used to identify Table entries"
        fields:         TableKey,Send
        options:  unique
#       key type:       PRIMARY
```

We claim:

1. A computer implemented production scheduling system for projecting future demand in a plurality of time intervals for at least one business item, s accounting for recurring variations in actual demand for the business item, and for scheduling production of the business item, the system comprising: a memory divided into separate files including a database comprising:

a base profile defining a base demand for the business item in each of a first plurality of time intervals;

at least one influence profile defining a variation of the base demand in each of a second plurality of time intervals;

at least one forecast profile defining in each of a plurality of future time intervals a forecasted demand for the business item as a function of a combination of the base profile and the at least one influence profile;

a data file containing actual current demand for the business item in each of a plurality of past time intervals;

a processor coupled to the memory to receive the base profile, and the at least one influence profile and to produce therefrom at least one forecast profile forecasting demand for the business item in each of a plurality of future time intervals; the processor further updating the base profile and the at least one influence profile in each of selected past time intervals with a weighted minimum update value in each selected time interval; and a production schedule apparatus coupled to the processor to receive a forecast profile and to produce therefrom a production schedule for the business item indicating a forecasted demand for the business item in a plurality of future time intervals.

2. The system of claim 1, wherein the weighted minimum update value is a function of:

a difference between the actual current demand and the forecasted demand, the difference bounded by a maximum and a minimum value; and, a ratio of the combined base profile and the at least one influence profile to a combined absolute value of the base profile and a combined absolute value of the at least one influence profile.

3. The system of claim 1, wherein there is provided at least one standard influence profile having unit values, the forecast profile is determined by the equation:

$$i=0 \xrightarrow{\sum_{j=0}^{n} \text{standard\_profile}_{i,j} + \text{base\_profile}_i} m$$

where m is a number of time intervals in the base profile;

n is a number of standard influence profiles;

standard_profile is a standard influence profile; and, base_profile is the base profile.

4. The system of claim 3, wherein there is provided at least one percentage influence profile having percentage values, the forecast profile is determined by the equation:

$$i=0 \xrightarrow{\text{forecast\_profile}_i * \left(1 + \sum_{j=0}^{n} \text{percent\_profile}_{i,j}\right)} m$$

where forecast_profile is the forecast profile; and, percent_profile is a percentage influence profile.

5. The system of claim 4, wherein there is provided at least one seasonality influence profile, the forecast profile is determined by the equation:

$$i=0 \xrightarrow{\text{season\_pro}_i + \text{forecast\_pro}_i} m$$

where season_pro is the seasonality influence profile.

6. The system of claim 1, wherein the updated base profile is determined by the equation:

$$i=0 \xrightarrow{[\text{base\_profile}_i * (1 - \text{profile\_weight}) + (\text{base\_profile}_i + \text{delta\_profile}_i) * \text{profile\_weight}]} m$$

where base_profile is the base profile prior to being updated;

profile_weight is a weighting value specifying a percentage of the base profile to apply to the updated base profile; and delta_profile is a function of a difference between the actual current demand and the forecast profile, the difference bounded by a maximum and a minimum value for updating the base profile, and a ratio of the combined base profile and the at least one influence profile to a combined absolute value of the base profile and a combined absolute value of the at least one influence profile.

7. The system of claim 1, wherein an updated influence profile is determined by the equation:

$$i=0 \xrightarrow{[\text{influence\_profile}_i * (1 - \text{profile\_weight}) + (\text{influence\_profile}_i + \text{delta\_profile}_i) * \text{profile\_weight}]} m$$

where influence_profile is an influence profile prior to being updated;

profile_weight is a weighting value specifying a percentage of the influence profile to apply to the updated influence profile; and delta_profile is a function of a difference between the actual current demand and the forecast profile, the difference bounded by a maximum and a minimum value for updating the influence profile and a ratio of the influence profile to a combined absolute value of the base profile and a combined absolute value of the at least one influence profile.

8. The system of claim 6, wherein the delta profile is determined by the equation:

$$\underset{i=0}{\overset{m}{\longrightarrow}} \text{if}\left(\left|\frac{base\_value_i}{profile\_sum_i}\right| \geq min\_update, \left|\frac{base\_value_i}{profile\_sum_i}\right| * delta_i, min\_update * delta_i\right)$$

where base_value is vector sum of the base profile and the at least one influence profile;

min_update is the minimum value for updating the base profile;

profile_sum is the combined absolute value of the base profile and the combined absolute value of the at least one influence profile; and, delta is a vector based on the function of the difference between the actual current demand and the forecast profile, the difference bounded by a maximum and the minimum value for updating the base profile.

9. The system of claim 8, wherein the delta vector is equal to the vector sum of a first vector determined by the equation:

$$\underset{i=0}{\overset{m}{\longrightarrow}} (actual\_dem_i - forecast_i) * \left(\left|\frac{actual\_dem_i - forecast_i}{forecast_i}\right| < max\_update\right)$$

and a second vector determined by the equation:

$$\underset{i=0}{\overset{m}{\longrightarrow}} max\_update * forecast_i * sign(actual\_dem_i - forecast_i) * \left(\left|\frac{actual\_dem_i - forecast_i}{forecast_i}\right| \geq max\_update\right)$$

where actual_dem is the actual demand for the business item in vector form;

forecast is the forecast profile; and, max_update is the maximum value for updating the base profile.

10. The system of claim 9, wherein profile_sum is determined by the equation:

$$\underset{i=0}{\overset{m}{\longrightarrow}} |base\_profile_i| + \sum_{j=0}^{n} |std\_pro_{i,j}|$$

where std_pro is an influence profile expressed in unit values.

11. The system of claim 10, wherein the profile_sum further includes in the vector sum a value modifier vector determined by the equation:

$$\underset{i=0}{\overset{m}{\longrightarrow}} base\_value_i * balance\_factor * \sum_{j=0}^{n} |percent\_pro_{i,j}|$$

where base_value is the combined base profile and at least one influence profile;

balance_factor is a specified weighting value for weighting the contribution of percentage influence profiles relative to standard influence profiles; and, percent_pro is a percentage influence profile.

12. The system of claim 7, wherein the delta profile is determined by the equation:

$$\underset{i=0}{\overset{m}{\longrightarrow}} \text{if}\left(\left|\frac{std\_pro_{j,i}}{profile\_sum_i}\right| \geq min\_update, \left|\frac{std\_pro_{j,i}}{profile\_sum_i}\right| * delta_i, min\_update * delta_i\right)$$

where std_pro is the at least one influence profile;

min_update is the minimum value for updating the base profile;

profile_sum includes the combined absolute value of the base profile and the combined absolute value of the at least one influence profile; and, delta is a vector based on the function of the difference between the actual current demand and the forecast profile, the difference bounded by a maximum and the minimum value for updating the base profile.

13. The system of claim 12, wherein the delta vector is equal to the vector sum of a first vector determined by the equation:

$$\overrightarrow{i=0 \longrightarrow m} \quad (\text{actual\_dem}_i\text{-forecast}_i) * \left(\left|\frac{\text{actual\_dem}_i\text{- forecast}_i}{\text{forecast}_i}\right| < \text{max\_update}\right)$$

and a second vector determined by the equation:

$$\overrightarrow{i=0 \longrightarrow m} \quad \text{max\_update} * \text{forecast}_i * sign(\text{actual\_dem}_i\text{-forecast}_i) * \left(\left|\frac{\text{actual\_dem}_i\text{- forecast}_i}{\text{forecast}_i}\right| \geqq \text{max\_update}\right)$$

where actual_dem is the actual demand for the business item in vector forecast is the forecast profile; and, max_update is the maximum value for updating the base profile.

14. The system of claim 1, wherein there is provided at least one percentage influence profile defining a percentage variation in the base demand in the base profile, each updated percentage influence profile determined by the equation:

$$\overrightarrow{i=0 \longrightarrow m} \quad \left[\text{percent-pro}_i * \left(1 - \frac{\text{profile\_weight}}{100}\right) + \text{weighted\_per\_pro}_i * \frac{\text{profile\_weight}}{100}\right]$$

where percent-pro is the percentage influence profile;

profile_weight is a weighting value specifying a percentage of the percentage influence profile to apply to the updated percentage influence profile; and, weight_per_pro is a combined value of the percentage influence profile and a delta vector, and the delta vector is a function of ratio of percentage influence profile to combinedvalue of all percentage influence profiles.

15. A computer implemented method of forecasting future demand for a business item, the method operable in a computer system including a memory for storing a plurality of files and procedures, comprising the steps storing in a memory actual demand for the business item in each of a first plurality of time intervals;

storing in the memory a base profile defining a historical actual demand for the business item in each of a second plurality of time intervals;

storing in the memory at least one influence profile defining a variation in demand for the business item due to an influence factor in each of a plurality of time periods, wherein the influence profiles include at least one of a set comprised of:

a standard influence profile defining a variation in demand in a same unit value as the base profile;

a percentage influence profile describing a variation in demand in as a percent change;

combining the base profile and selected influence profiles to produce a production schedule including a forecast profile projecting demand for the business item in a selected plurality of future time intervals;

monitoring actual demand for the business item in each of the future time intervals as such future time intervals become present or past time intervals, to create an actual demand profile; and, updating the base profile and the selected influence profiles with respect to the actual demand profile, wherein updating comprises:

determining a total error between the actual demand and the forecast profile;

determining for the base profile a percent contribution of the base profile to the total error;

determining for each influence profile a percent contribution of the influence profile to the total error;

updating the base profile by its percent contribution to the total error; and, updating each influence profile by its percent contribution to the total error.

16. The method of claim 15, wherein the step of updating the base profile and the selected influence profiles, comprises, for each past or present time interval, the steps of:

combining the base profile with selected influence profiles;

determining a weighted delta profile for the base profile describing the impact of the base profile on the forecast profile;

determining a weighted delta profile for each influence profile describing the impact of the influence profile on the forecast profile;

updating the base profile by its weighted delta profile, and a weighting factor associated with the base profile; and, updating each influence by its weighted delta profile, and a weighting factor associated with the influence profile.

17. The method of claim 16, wherein the step of combining the base profile and selected influence profiles to create a forecast profile further comprises the steps of:

summing the base profile with selected standard influence profiles;

normalizing percentage influence profiles to define demand in a same unit as the base profile;

summing the normalized percentage influence profiles; and, multiplying summed percentage influence profiles by the summed base profile and standard influence profile to produce a forecast profile.

18. The method of claim 17, further comprising the step of:

summing the forecast profile with a seasonality influence profile describing a variation in demand resulting from a seasonal influence to produce an adjusted forecast profile.

19. The method of claim 15, wherein there is provided at least one standard influence profile having unit values, the step of combining the base profile and selected influence profiles comprises determining the forecast profile by the equation:

$$i=0 \xrightarrow[\sum_{j=0}^{n} \text{standard\_profile}_{i,j} + \text{base\_profile}_i]{} m$$

where m is a number of time intervals in the base profile;

n is a number of standard influence profiles;

standard_profile is a standard influence profile; and, base_profile is the base profile.

20. The method of claim 19, wherein there is provided at least one percentage influence profile having percentage values, the step of combining the base profile with selected influence profiles further comprises determining the forecast profile with the equation:

$$i=0 \xrightarrow[\text{forecast\_profile}_i * \left(1 + \sum_{j=0}^{n} \text{percent\_profile}_{i,j}\right)]{} m$$

where forecast_profile is the forecast profile; and, percent_profile is a percentage influence profile.

21. The method of claim 19, wherein there is provided at least one seasonality influence profile, the step of combining the base profile with selected influence profiles further comprises determining the forecast profile with the equation:

$$i=0 \xrightarrow[\text{season\_pro}_i + \text{forecast\_pro}_i]{} m$$

where season_pro is the seasonality influence profile.

22. The method of claim 15, the step of updating the base profile updating the base profile by its percent contribution to the total error comprises determining the updated base profile with the equation:

$$i=0 \xrightarrow[[\text{base\_profile}_i * (1 - \text{profile\_weight}) + (\text{base\_profile}_i + \text{delta\_profile}_i) * \text{profile\_weight}]]{} m$$

where base_profile is the base profile prior to being updated;

profile_weight is a weighting value specifying a percentage of the base profile to apply to the updated influence profile; and delta_profile is the percent contribution to the total error as a function of a difference between the actual current demand and the forecast profile, the difference bounded by a maximum and a minimum value for updating the base profile, and a ratio of the combined base profile and the at least one influence profile to a combined absolute value of the base profile and a combined absolute value of the at least one influence profile.

23. The method of claim 15, the step of updating each influence profile by its percent contribution to the total error comprises each influence profile with the equation:

$$i=0 \xrightarrow[[\text{influence\_profile}_i * (1 - \text{profile\_weight}) + (\text{influence\_profile}_i + \text{delta\_profile}_i) * \text{profile\_weight}]]{} m$$

where influence_profile is an influence profile prior to being updated;

profile_weight is a weighting value specifying a percentage of the influence profile to apply to the updated influence profile; and, delta_profile is the percent contribution to the total error as a function of a difference between the actual current demand and the forecast profile, the difference bounded by a maximum and a minimum value for updating the influence profile and a ratio of the influence profile to a combined absolute value of the base profile and a combined absolute value of the at least one influence profile.

24. The method of claim 22, wherein the delta profile is determined by the equation:

$$i=0 \xrightarrow[\text{if}\left(\left|\frac{\text{base\_value}_i}{\text{profile\_sum}_i}\right| \geqq \text{min\_update}, \left|\frac{\text{base\_value}_i}{\text{profile\_sum}_i}\right| * \text{delta}_i, \text{min\_update} * \text{delta}_i\right)]{} m$$

where base_value is vector sum of the base profile and the at least one influence profile;

min_update is the minimum value for updating the base profile;

profile_sum is the combined absolute value of the base profile and the combined absolute value of the at least one influence profile; and, delta is a vector based on the function of the difference between the actual current demand and the forecast profile, the difference bounded by a maximum and the minimum value for updating the base profile.

25. The method of claim 24, wherein the delta vector is set equal to the vector sum of a first vector determined by the equation:

$$i=0 \xrightarrow{\hspace{6em}} m$$
$$(\text{actual\_dem}_i - \text{forecast}_i) * \left(\left|\frac{\text{actual\_dem}_i - \text{forecast}_i}{\text{forecast}_i}\right| < \text{max\_update}\right)$$

and a second vector determined by the equation:

$$i=0 \xrightarrow{\hspace{6em}} m$$
$$\text{max\_update} * \text{forecast}_i * sign(\text{actual\_dem}_i - \text{forecast}_i) * \left(\left|\frac{\text{actual\_dem}_i - \text{forecast}_i}{\text{forecast}_i}\right| \geqq \text{max\_update}\right)$$

where actual_dem is the actual demand for the business item in vector form;

forecast is the forecast profile; and, max_update is the maximum value for updating the base profile.

26. The method of claim 25, wherein profile_sum is determined by the equation:

$$i=0 \xrightarrow{\hspace{6em}} m$$
$$|\text{base\_profile}_i| + \sum_{j=0}^{n} |\text{std\_pro}_{i,j}|$$

where std_pro is an influence profile expressed in unit values.

27. The method of claim 26, wherein the profile_sum further includes in the vector sum a value modifier vector set equal to:

$$i=0 \xrightarrow{\hspace{6em}} m$$
$$\text{base\_value}_i * \text{balance\_factor} * \sum_{j=0}^{n} |\text{percent\_pro}_{i,j}|$$

where base_value is the combined base profile and at least one influence profile;

balance_factor is a specified weighting value for weighting the contribution of percentage influence profiles relative to standard influence profiles; and, percent_pro is a percentage influence profile.

28. The method of claim 23, wherein the delta profile is determined by the equation:

$$i=0 \xrightarrow{\hspace{6em}} m$$
$$\text{if}\left(\left|\frac{\text{std\_pro}_{j,i}}{\text{profile\_sum}_i}\right| \geqq \text{min\_update}, \left|\frac{\text{std\_pro}_{j,i}}{\text{profile\_sum}_i}\right| * \text{delta}_i, \text{min\_update} * \text{delta}_i\right)$$

where std_pro is the at least one influence profile;

min_update is the minimum value for updating the base profile;

profile_sum includes the combined absolute value of the base profile and the combined absolute value of the at least one influence profile; and, delta is a vector based on the function of the difference between the actual current demand and the forecast profile, the difference bounded by a maximum and the minimum value for updating the base profile.

29. The method of claim 28, wherein the delta vector is set equal to the vector sum of a first vector equal to:

$$i=0 \xrightarrow{\hspace{6em}} m$$
$$(\text{actual\_dem}_i - \text{forecast}_i) * \left(\left|\frac{\text{actual\_dem}_i - \text{forecast}_i}{\text{forecast}_i}\right| < \text{max\_update}\right)$$

and a second vector equal to:

$$i=0 \xrightarrow{\hspace{6em}} m$$
$$\text{max\_update} * \text{forecast}_i * sign(\text{actual\_dem}_i - \text{forecast}_i) * \left(\left|\frac{\text{actual\_dem}_i - \text{forecast}_i}{\text{forecast}_i}\right| \geqq \text{max\_update}\right)$$

where actual_dem is the actual demand for the business item in vector form;

forecast is the forecast profile; and, max_update is the maximum value for updating the base profile.

30. The method of claim 15, wherein there is provided at least one percentage influence profile defining a percentage variation in the base demand in the base profile, the step of updating the base profile and the selected influence profiles comprises setting each updated percentage influence profile equal to:

$$\xrightarrow[i=0]{} m \left[ \text{percent-pro}_i * \left(1 - \frac{\text{profile\_weight}}{100}\right) + \text{weighted\_per\_pro}_i * \frac{\text{profile\_weight}}{100} \right]$$

where percent-pro is the percentage influence profile;

profile_weight is a weighting value specifying a percentage of the percentage influence profile to apply to the updated percentage influence profile; and, weight_per_pro is a combined value of the percentage influence profiles and a delta vector, the delta vector being a function of ratio of percentage influence profile to combinedvalue of all percentage influence profiles.

31. The method of claim 16, wherein there is provided at least one standard influence profile having unit values, and at least one percentage influence profile having percentage values, the base profile is combined with selected influence profiles using the equation:

$$\xrightarrow[i=0]{} m \left(1 + \sum_{j=0}^{n} \text{percent\_profile}_{i,j}\right) * \text{base\_value}_i$$

where:

percent_profile is a percentage influence profile;

standard_profile is a standard influence profile;

m is a number of time intervals in the base profile;

n is a number of standard influence profiles; and base_value is determined by the equation:

$$\xrightarrow[i=0]{} m \sum_{j=0}^{n} \text{standard\_profile}_{i,j} + \text{base\_profile}_i$$

where:

standard_profile is a standard influence profile; and, base_profile is the base profile.

32. The method of claim 31, wherein a weighted delta profile for the base profile is determined by the equation:

$$\xrightarrow[i=0]{} m \ \text{if}\left(\left|\frac{\text{base\_value}_i}{\text{profile\_sum}_i}\right| \geq \text{min\_update}, \left|\frac{\text{base\_value}_i}{\text{profile\_sum}_i}\right| * \text{delta}_i, \text{min\_update} * \text{delta}_i\right)$$

where:

min_update is the minimum value for updating the base profile;

profile_sum includes the combined absolute value of the base profile and the combined absolute value of the at least one influence profile; and, delta is a vector based on the function of the difference between the actual current demand and the forecast profile, the difference bounded by a maximum and the minimum value for updating the base profile.

33. The method of claim 32, wherein the delta vector is set equal to the vector sum of a first vector equal to:

$$\xrightarrow[i=0]{} m \ (\text{actual\_dem}_i\text{-forecast}_i) * \left(\left|\frac{\text{actual\_dem}_i\text{- forecast}_i}{\text{forecast}_i}\right| < \text{max\_update}\right)$$

and a second vector equal to:

$$\xrightarrow[i=0]{} m \ \text{max\_update} * \text{forecast}_i * sign(\text{actual\_dem}_i\text{-forecast}_i) * \left(\left|\frac{\text{actual\_dem}_i\text{- forecast}_i}{\text{forecast}_i}\right| \geq \text{max\_update}\right)$$

where:

actual_dem is the actual demand for the business item in vector form;

forecast is the forecast profile; and, max_update is a maximum value for updating the base profile.

34. The method of claim 33, wherein the updated based profile is determined by the equation:

$$i=0 \xrightarrow[{[\text{base\_profile}_i * (1 - \text{profile\_weight}) + (\text{base\_profile}_i + \text{delta\_profile}_i) * \text{profile\_weight}]}]{} m$$

where:

base_profile is the base profile prior to being updated;

profile_weight is a decimal weighting value specifying a percentage of the base profile to apply to the updated base profile; and delta_profile is the weighted delta profile for the base profile.

35. The method of claim 33, wherein there is provided at least one standard influence profile, the weighted delta profile for each standard influence profile is determined by the equation:

$$i=0 \xrightarrow[{\text{if}\left(\left|\frac{\text{std\_pro}_{j,i}}{\text{profile\_sum}_i}\right| \geqq \text{min\_update}, \left|\frac{\text{std\_pro}_{j,i}}{\text{profile\_sum}_i}\right| * \text{delta}_i, \text{min\_update} * \text{delta}_i\right)}]{} m$$

where std_pro is the at least one standard influence profile, min_update is the minimum value for updating the base profile, profile_sum includes the combined absolute value of the base profile and the combined absolute value of the at least one influence profile, and, delta is the delta vector.

36. The method of claim 15, wherein the updated influence profile is determined by the equation:

$$i=0 \xrightarrow[{[\text{influence\_profile}_i * (1 - \text{profile\_weight}) + (\text{influence\_profile}_i + \text{delta\_profile}_i) * \text{profile\_weight}]}]{} m$$

where:

influence_profile is an influence profile prior to being updated;

profile_weight is a decimal weighting value specifying a percentage of the influence profile to apply to the updated influence profile; and delta_profile is the weighted delta profile for the influence profile.

37. The method of claim 15, wherein there is provided at least one percentage influence profile defining a percentage variation in the base demand in the base profile, the weighted delta profile for each percentage influence profile is determined by the equation:

$$i=0 \xrightarrow[{[\text{percent-pro}_i * (1 - \text{profile\_weight}) + \text{weighted\_per\_pro}_i * \text{profile\_weight}]}]{} m$$

where percent-pro is the percentage influence profile;

profile_weight is a decimal weighting value specifying a percentage of the percentage influence profile to apply to the updated percentage influence profile; and, weight_per_pro is weighted percentage profile determined by a function of a combined value of the percentage influence profiles, and the delta vector.

38. The method of claim 37, wherein the weighted percentage profile is determined by the equation:

$$i=0 \xrightarrow[{\text{percent\_pro}_{i,j} + \text{delta\_percent\_pro}_{i,j} * 100}]{} m$$

where percent_pro is a percentage profile; and, delta_percent_pro is a weighted delta percentage profile determined by the equation:

$$i=0 \xrightarrow[{\text{if}\left(\begin{array}{l}\left|\frac{\text{percent\_pro}_{i,j}}{\%\text{profile\_sum}_{ij}} * \delta\text{percent}_{i,j}\right| \geqq \text{min\_update}, \\ \left|\frac{\text{percent\_pro}_{i,j}}{\%\text{profile\_sum}_{ij}}\right| * \delta\text{percent}_{i,j}, \\ \text{min\_update} * \text{sign}(\delta\text{percent}_{i,j})\end{array}\right)}]{} m$$

where

% profile_sum is the summation of the percentage influence profiles; and,

δ percent is a profile describing the overall impact of the percentage influence profiles on a combined base profile and influence profiles.

39. The method of claim 38, wherein δ percent is determined by the equation:

$$i=0 \xrightarrow[{\frac{\text{delta}_i - \text{tot\_delta}_i * \text{percent\_value}_i}{\text{base\_value}_i + \text{tot\_delta}_i}}]{} m$$

where:

delta is the delta vector;

base_value is the combined base profile and standard influence profiles;

tot_delta is the weighted delta profile of the base profile combined with the weighted delta profiles of the standard influence profiles; and, percent_value is normalized combined percentage influence profiles.

40. The method of claim 32, wherein profile_sum is determined by the equation:

$$\overrightarrow{\left|base\_profile_i\right| + \sum_{j=0}^{n} \left|std\_pro_{i,j}\right|}\Big|_{i=0}^{m}$$

where std_pro is an influence profile expressed in unit values.

41. The method of claim 40, wherein the profile_sum further includes in the vector sum a value modifier vector set equal to:

$$\overrightarrow{base\_value_i * balance\_factor * \sum_{j=0}^{n} \left|percent\_pro_{i,j}\right|}\Big|_{i=0}^{m}$$

where balance_factor is a specified weighting value for weighting the contribution of percentage influence profiles relative to standard influence profiles; and, percent_pro is a percentage influence profile.

42. The method of claim 19, wherein the forecast profile is further determined by the equation:

$$\overrightarrow{season\_pro_i + forecast\_pro_i}\Big|_{i=0}^{m}$$

where season_pro is a seasonality influence profile defining variations in demand on a seasonal basis; and, forecast_pro is the forecast profile.

43. The method of claim 15, further comprising the steps of:

selecting influence profiles;

associating the selected influence profiles as a group; and, combining the group of selected influence profiles with the base profile to create a forecast profile.

44. The method of claim 15, wherein the step of storing in the memory at least one influence profile defining a variation in demand for the business item comprises the steps of:

specifying a business item;

specifying a plurality of time intervals for the influence profile;

specifying a weighting factor to be used to update the influence profile; and, providing a data value for each time interval specified in the influence profile.

45. The method of claim 44, wherein the step of specifying a plurality of time intervals further includes:

specifying a beginning of a first time interval; and, specifying a length of time for subsequent time intervals.

46. The method of claim 44, wherein the step of specifying a plurality of time intervals further includes:

specifying a beginning time of a first time interval;

specifying an ending time of a last time interval; and, specifying a length of each time interval between the beginning time and ending time.

47. The method of claim 44, further comprising the steps of:

specifying a unit type for the influence profile, the unit type being one of a numerical count, a currency value, or a physical quantity unit.

48. The method of claim 44, further comprising the step of:

specifying the type of influence profile being one of a standard influence profile, a percentage influence profile, or a seasonal influence profile.

* * * * *